US006772131B1

(12) United States Patent
Francis et al.

(10) Patent No.: US 6,772,131 B1
(45) Date of Patent: Aug. 3, 2004

(54) DISTRIBUTED, OBJECT ORIENTED GLOBAL TRADE FINANCE SYSTEM WITH IMBEDDED IMAGING AND WORK FLOW AND REFERENCE DATA

(75) Inventors: James G. Francis, Northport, NY (US); Ronald W. Carden, Herndon, VA (US)

(73) Assignee: American Management Systems, Inc., Fairfax, VA (US)

(*) Notice: Subject to any disclaimer, the term of this patent is extended or adjusted under 35 U.S.C. 154(b) by 0 days.

(21) Appl. No.: 09/241,301

(22) Filed: Feb. 1, 1999

(51) Int. Cl.[7] .............................................. G06F 17/60
(52) U.S. Cl. ........................ 705/35; 705/42; 705/39
(58) Field of Search .............................. 705/35, 37, 39, 705/42; 709/300, 302; 395/239

(56) References Cited

U.S. PATENT DOCUMENTS

| | | | | |
|---|---|---|---|---|
| 4,417,136 A | * | 11/1983 | Rushby et al. | 235/379 |
| 5,457,797 A | * | 10/1995 | Butterworth et al. | 709/302 |
| 5,764,981 A | * | 6/1998 | Brice et al. | 705/6 |
| 5,784,610 A | * | 7/1998 | Copeland, III et al. | 707/104 |
| 5,890,140 A | * | 3/1999 | Clark et al. | 705/35 |
| 5,946,667 A | * | 8/1999 | Tull, Jr. et al. | 705/36 |
| 6,025,931 A | * | 2/2000 | Bloomfield | 358/402 |
| 6,055,514 A | * | 4/2000 | Wren | 705/26 |
| 6,119,104 A | * | 9/2000 | Brumbelow et al. | 705/35 |
| 6,360,137 B1 | * | 3/2002 | Royal et al. | 700/231 |

OTHER PUBLICATIONS

AMS TradeLine™ Letter of Credit System (LCS), AMS Corporate Marketing Communications, 1996.
AMS TradeLine™ Collection Processing System (CPS), AMS Corporate Marketing Communications, 1996.
Trade Finance Superiority, AMS Corporate Marketing Communications, 1996.
AMS TradeLine/Client Server™, AMS Corporate Marketing Communications, 1996.

* cited by examiner

*Primary Examiner*—Jeffrey Pwu
(74) *Attorney, Agent, or Firm*—Staas & Halsey LLP

(57) ABSTRACT

An object oriented trade finance system designed to support a large-scale transactional work flow on a global basis. The system is designed to support imbedded imaging technology for the scanning, storage and retrieval of all documents coming into and going out of the system. The system allows for the distribution of processing across geographic boundaries while also providing the ability to perform high-volume transaction processing. The system supports all facets of the trade finance business. The trade finance system is organized into a central and distributed location hardware architecture with a three tier software architecture. Work flow distribution rules are used to distribute the work items to a work item list for work group that can be distributed geographically in different time zones. The rules also redistribute the work items as needed to allow processing to continue when the originally assigned workgroup has reached an end of its business day.

17 Claims, 27 Drawing Sheets

| KEY | ACTIVITY | CUST. | BANK ORG. | PRODUCT | PROD TYPE | WORK GROUP | WORKER |
|---|---|---|---|---|---|---|---|
| | 278 | 276 | 284 | 280 | 282 | 272 | 274 |
| 0021145171 | ISS | 1394 | | SLC | OUT | | 917 |
| 0021145172 | AMD | 1394 | | SLC | OUT | RMBG | |
| 0021146795 | | | 864 | DIR | | COLL | |

| KEY | ACTIVITY | CUST. | BANK ORG. | PROD. | PROD. TYPE | CUT OFF TIME 292 | DAY INCRE. 294 | HOUR INCRE. 296 | POST DAY INCRE. 302 | POST HOUR INCRE. 304 | PRIOR DAY INCRE. 298 | PRIOR HOUR INCRE. 300 |
|---|---|---|---|---|---|---|---|---|---|---|---|---|
| 34952 | ISS | 34937 | | SLC | | 12:00:00 | | | | | | |
| 74223 | ISS | | 839 | DLC | IMP | | 1 | | | | | |
| 74224 | AMD | | 839 | DLC | IMP | | | 5 | | | 1 | |
| 21145173 | ISS | 1394 | | SLC | OUT | | | 50 | 1 | | | |

| Instrument No. | Work Item Type | Activity Type | Seq. No. | Activity Status | Current Statuses | Due Date | Due Time | |
|---|---|---|---|---|---|---|---|---|
| BP031A | Bulk Payment | Bulk Payment | 3 | Started | STR | 10/19/98 | 10:00:00 AM | D |
| BP031A | Doc Examination | Doc Examination | 2 | Released | ENT | 10/13/98 | 10:00:00 AM | D |
| BP031A | Doc Examination | Doc Examination | 3 | Started | STR | 10/19/98 | 10:00:00 AM | D |
| BP031B | Doc Examination | Doc Examination | 2 | Released | ENT | 10/13/98 | 10:00:00 AM | D |
| BP031C | Doc Examination | Doc Examination | 2 | Released | DCA | 10/13/98 | 10:00:00 AM | D |
| CO071 | Pay Collection | Payment | 1 | Chrgs Complete | CHG | 10/27/98 | 10:00:00 AM | D |
| DINA1 | Application | Issue | | Started | STR | 10/22/98 | 10:00:00 AM | D |
| DLC1689INY | Application | Issue | | Logged | LOG | 10/27/98 | 05:30:00 PM | D |
| I0081 | Amend Req | Amendment | 2 | Started | STR | 10/20/98 | 10:00:00 AM | D |
| I0081 | Docs For Pay | Payment | 2 | Released | REL | 10/23/98 | 12:39:05 PM | D |
| I0101 | Docs For Pay | Payment | 1 | Released | RFA | 10/01/98 | 02:06:44 PM | D |
| TF1DLC | Application | Issue | | Entry Complete | ENT | 09/24/98 | 05:30:00 PM | D |

FIG. 14A

| Product | Product Type | Relationship Customer | Priority | Currency | Amount | Activity Detail Type |
|---|---|---|---|---|---|---|
| Documentary LC | Import | United States Trading Com... | Medium | | | Master Bulk Pay |
| Documentary LC | Import | United States Trading Com... | Medium | FRF | 1,000,000.00 | |
| Documentary LC | Import | United States Trading Com... | Medium | | | |
| Documentary LC | Import | United States Trading Com... | Medium | FRF | 1,000,000.00 | |
| Documentary LC | Import | United States Trading Com... | Medium | FRF | 1,000,000.00 | |
| Doc Collection | Incoming | Los Angeles Trading Comp... | Medium | USD | 22,000.00 | |
| Documentary LC | Import | | Medium | | | |
| Documentary LC | Import | United States Trading Com... | Medium | USD | 13,500.00 | |
| Documentary LC | Import | Western US Trading Comp... | Medium | | | |
| Documentary LC | Import | Western US Trading Comp... | Medium | USD | 231,000.00 | |
| Documentary LC | Import | Los Angeles Trading Comp... | Medium | USD | 75,000.00 | |
| Documentary LC | Import | | Medium | USD | 5,000.00 | |

DISTRIBUTED, OBJECT ORIENTED GLOBAL TRADE FINANCE SYSTEM WITH IMBEDDED IMAGING AND WORK FLOW AND REFERENCE DATA

BACKGROUND OF THE INVENTION

1. Field of the Invention

The present invention is directed to a system for performing trade finance operations and, more particularly, a system that allows centralized processing for a globally distributed trade finance business.

2. Description of the Related Art

Conventional trade finance processing, such as the processing for an individual letter of credit, is generally performed at one processing site starting with the receipt a document/message, such as, an application or payment document and concluding with the sending of the resulting outgoing documents/messages. Initiating documents may have been received by the processing site via fax or a stand alone imaging system, but processing in the trade finance system starts once they have been received. Almost all large banks with a global presence have multiple processing sites for many geographically diverse locations, each processing trade finance instruments according to its local market demands and practices. This typically results in a collection of processing systems implemented in their domestic Back Office and the various foreign branches with little or no integration between them. At the other extreme, a few banks have consolidated all of their processing in one (or a few) location(s), using stand alone imaging, fax, couriers or other means to transport documents to and from the customer business sites to the processing sites. The systems implemented to support these processing centers attempt to achieve economies of scale but fail to fully integrate the end-to-end process that starts when the document/message reaches the bank, rather than the processing center. A typical example of such a system is the TradeLine™ system available from American Management Systems of Virginia. What is needed is a system that inherently operates in a global technical architecture. One that captures the end-to-end process and allows the bank to optimally the configure its global customer service and processing organizations. One that permits the bank to locate the processing centers wherever they want (for instance, at a low cost site), without sacrificing the local customer service at the customer site or special customer or local processing practices.

SUMMARY OF THE INVENTION

It is an object of the present invention to provide a trade finance system that can operate in a decentralized or a centralized global processing environment.

It is another object of the present invention to provide a trade finance system that can be configured to capture and process activities at their entry points into the bank, or to capture the activities at the entry points, but process them at another location.

It is also an object of the present invention to allow for consolidation of trade finance operations to gain efficiencies in manpower and resources.

It is an additional object of the present invention to provide a trade finance system in which operations can be distributed over diverse geographic areas and time zones via a hub and spoke configuration.

It is another object of the present invention to provide a flexible three tier architecture with a presentation layer for user access, a business logic layer for all validation of information and a database layer for storage and retrieval of data.

It is an additional object of the present invention to provide a partitioned architecture that includes the ability for the system to operate over distant locations as well as the ability for the system to handle global transaction volumes.

It is also an object of the present invention to provide integrated global work flow allowing trade finance work to move from location to location as workers become available in different time zones and as desired to meet customer service agreements as well as to balance work load among workers or processing centers.

It is an object of the present invention to support the definition of contextual reference data for each relevant location whether a hub or spoke where contextual reference data includes data and time information, instructions (text, fees and charges, settlement, refinancing, and purchase order), system settings, foreign exchange rates, calendars, base currency, and accounting rules.

It is an object of the present invention to automatically apply the contextual reference data of the trade instrument's owning location (set at creation) regardless of who or where the instrument's activities are processed, thus, ensuring automatic compliance with the appropriate customer and local practices.

It is a further object of the present invention to provide embedded imaging allowing a worker working on an electronic version of a trade work item to view electronic copies of documents associated with the work item.

It is an object of the present invention to provide robust and easily available information for query and reporting across the global configuration of locations.

It is a another object of the present invention to provide a system using object oriented technology to provide an ability to quickly adapt the system to new business or technology trends.

The above objects can be attained by a trade finance system organized into a hub and spoke configuration with a three tier software architecture. Embedded imaging work flow is provided allowing users to view copies of the trade finance documents as work items are processed. Work flow distribution rules distribute the work items to a worker or work-group for processing and redistribute the work items as needed to allow processing to continue when the originally assigned worker or work-group has reached an end of it's business day.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 12 is a distribution rules table.

FIG. 13 is an out-by-date table.

FIGS. 14A and 14B depict a work in progress window.

FIG. 16 is a window showing source organization and due date.

FIGS. 20A and 20B depict an ability to select a language of the user interface.

DESCRIPTION OF THE PREFERRED EMBODIMENTS

The present invention is directed to a trade finance system which includes automated imaging and work flow management capabilities for a trade finance life cycle. The system captures, stores, prioritizes, distributes and processes trade instruments, such as documentary letters of credit, documentary collections, bankers acceptances, reimbursement authorizations, etc. The system also provides for the full range of transactions including issuances, advisements, amendments, payments, liquidations, etc. The system provides specialized processing to facilitate more complex trade scenarios which include: foreign and third currency settlement, etc. Additionally the system supports an extensive set of services, such as SWIFT, Telex and Facsimile messaging, etc. The system also is capable of producing the complete range of international trade processing reports. The invention further provides a set of on-line inquiries to provide real-time information to the trade services specialist.

Figure 1:
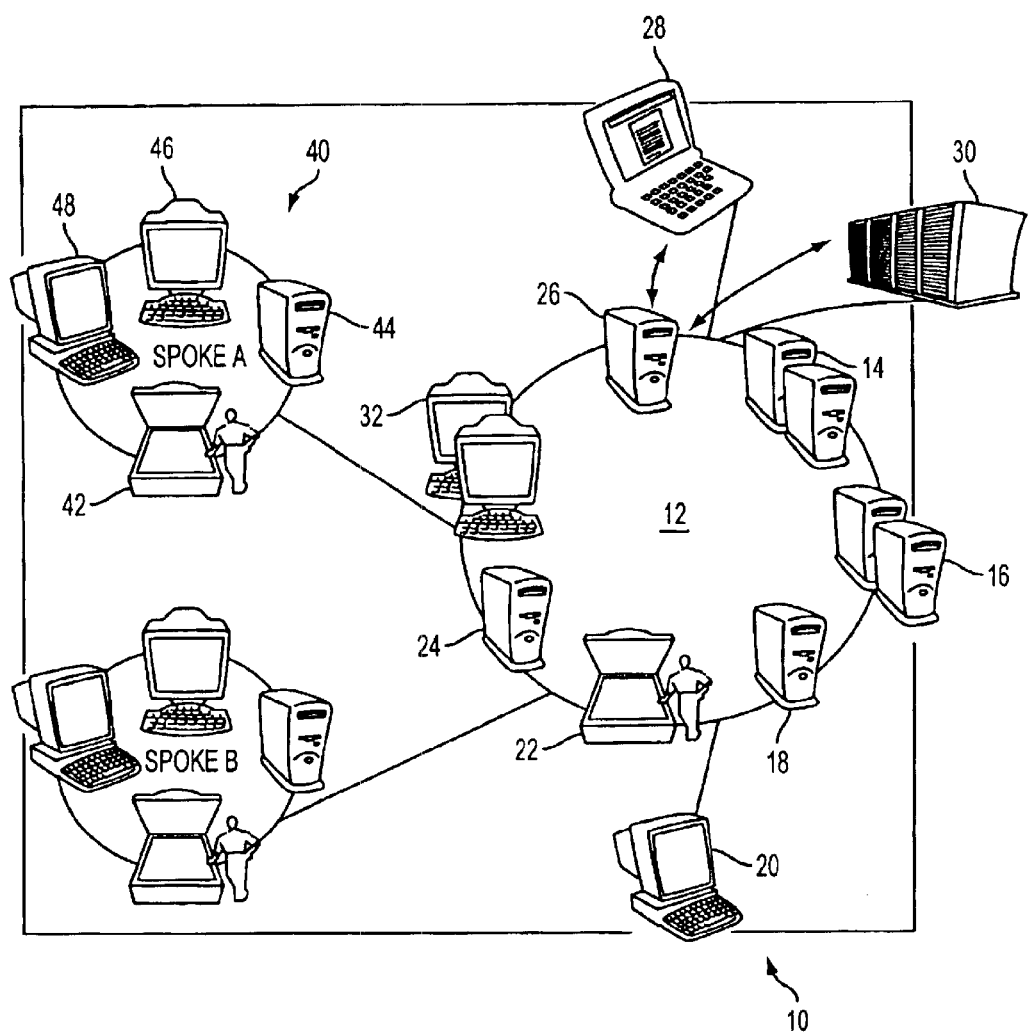
FIG. 1 illustrates the hub and spoke arrangement of the present invention.

The system provides the above discussed features and capabilities preferably with a distributed hardware architecture 10, an example of which is illustrated in FIG. 1. The architecture 10 is a preferably a hub and spoke architecture where the hub and spokes are themselves rings. The hub and spokes can be located in different geographic regions, such as the hub being located in New York and a spoke being located in Hong Kong. A central hub 12, designed as a ring or LAN, preferably includes object or application servers 14 which perform various application processing operations, such as executing business objects that include the business logic of the system. For example, a business object can draw-down or replenish a line of credit. Database servers 16 store trade finance data used by the system in the various operations. A reporting server 18 generates reports from a copy of the system database to allow reports to be generated without affecting the on-going operations of the system. The reports can be initiated and reviewed by a reporting capable work station 20. The server 18 preferably executes a reporting tool such as BusinessObjects™ available from Business Objects of France. The invention includes the ability to capture documents, such as an application for a letter of credit, using a high resolution document scanner 22. The primary copies of such documents are stored in and can be accessed via a central imaging server 24. However, as will be discussed later herein, secondary copies of the documents can be stored in other (local) imaging servers. An interface gateway 26 is provided to allow the system to link with remote customer entry stations 28 and a central legacy system 30. User machines 32 are also provided in the hub 12 and allow the operations discussed herein to be performed at the hub as well as at the spokes.

A typical production spoke 40, preferably a ring or LAN, includes a high resolution document scanner 42 to allow locally created documents to be imaged. These locally created or scanned documents are stored as copies on a local image server 44 and the original image is provided to the central imaging server 24. These local servers 44 also store the images of documents that are currently being used by the spoke 40 when a copy is not originally present in the spoke. For example, if a customer representative in Hong Kong is discussing a Hong Kong customer's line of credit with the customer, the primary copy is stored in the server 24, a copy can be made and stored in server 44 for access by the customer representative. The spoke 40 also includes customer support machines 46 and 48 which the customer representatives use to assist customers and to perform trade finance operations.

The hub and spokes are typically connected together via a Ti transmission line while the local hub or spoke rings preferably have LAN speeds of 16 MB/sec. The servers are preferably 300 MHz Pentium II™ class machines running Windows NT™ while the client machines such as the desktops and customer support machines are preferably 200 MHZ Pentium II™ class machines running Windows NT™ or 95/98™. The client machines 32,46,48 and the application servers 14 preferably execute objects created using the Powerbuilder™ 6.0 tool available from Sybase, Inc., the database server 16 and reporting server 18 provide data and report services preferably using Oracle™ 7.3 and the imaging server 24 performs imaging operations with imaging software called Panagon™ available from FileNet (USA). The system provides enough flexibility so that the database and the imaging systems can be replaced with other third party vendor solutions.

Figure 2:
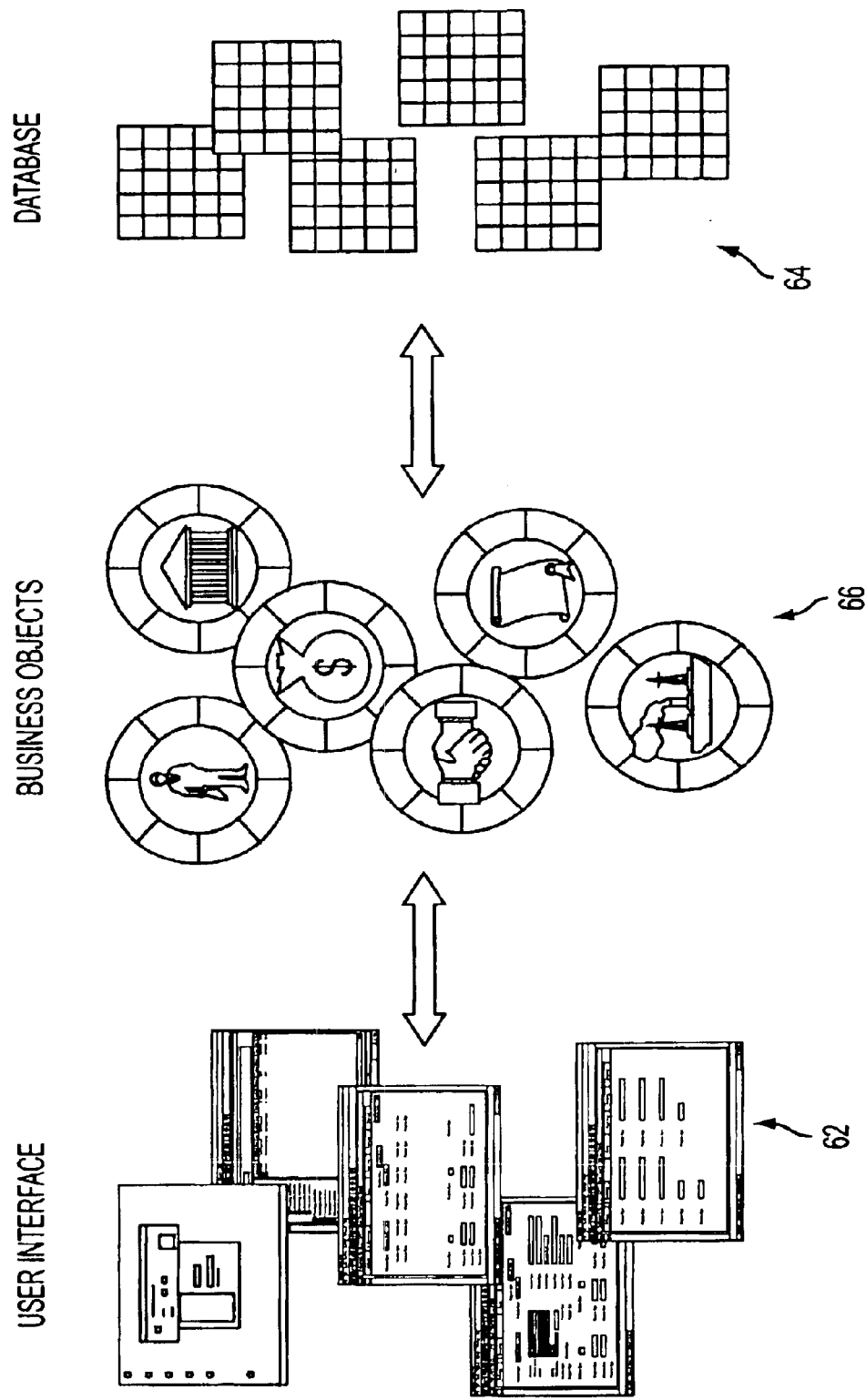
FIG. 2 depicts the three tier structure of the present invention.

The present invention also provides a three tier or layer software architecture 60, as depicted in FIG. 2, which facilitates improved processing such as by allowing load balancing. The layer visible to the user is the user interface layer 62 which is primarily concerned with presentation or output of information to the user and input of information from the user. The user interface layer 62 can contain limited logic and contains no connections to the database 64. The user interface layer 62 communicates with the business objects in a business objects tier or layer 66 to get, update and process trade finance information. The database tier or layer 64 provides for the storage of data, does not provide any business logic and is accessed only through the business objects of layer 66. The business objects layer 66 includes the business logic of the trade finance system. These objects are preferably created using the PowerBuilder™ system previously mentioned. The business objects perform all of the validation, updating and processing of the trade finance data. That is, the business objects include the logic necessary to perform all of the trade finance functions of a system such as the AMS TradeLine™ system. Essentially, the trade finance functions of the TradeLine™ system have been converted into business objects 66 using the Power- Builder™ tool. The business objects 66 are called by the user interface and other business objects. The business objects 66 can run on the various servers as well as the client machines, such as the customer support 46 and user 32 machines.

The communication between the interface 62 and the business objects 66 is preferably through an object communication service. When the user interface requires data from the business object (for example when displaying a window), the object communication service identifies all of the fields in the window and bundles them into a request. The object communication service would then call the GetAttribute responsibility of the business object associated with the window, passing it the list of attributes (e.g., fields) that it would like to get. The business object responds with a list of the values which correspond to the requested attributes, and the object communication service will fill in the window with the returned information.

When a field has been modified in the user interface 62, the object communication service sends the name of the field, along with it's new value, to the business object to update it.

Figure 3:
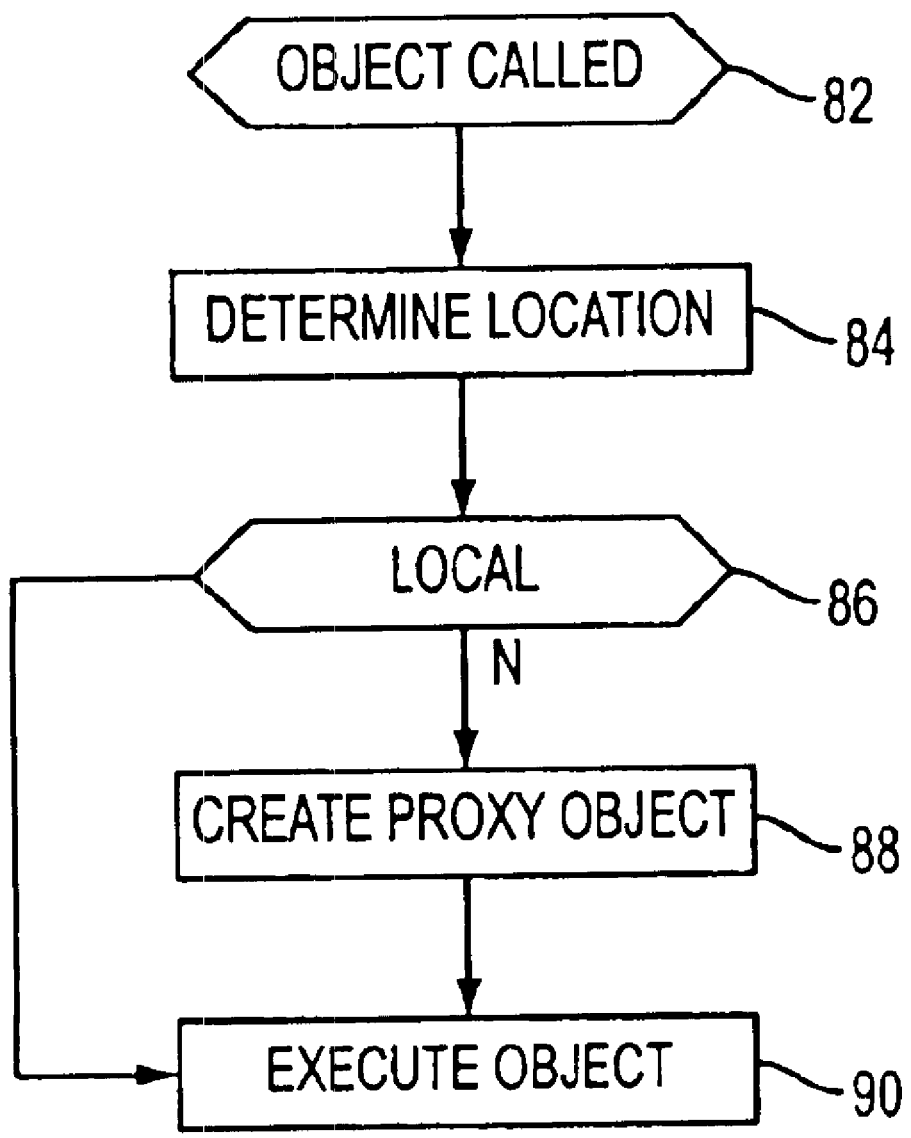
FIG. 3 shows operations performed when executing objects according to the present invention.
Figure 4:
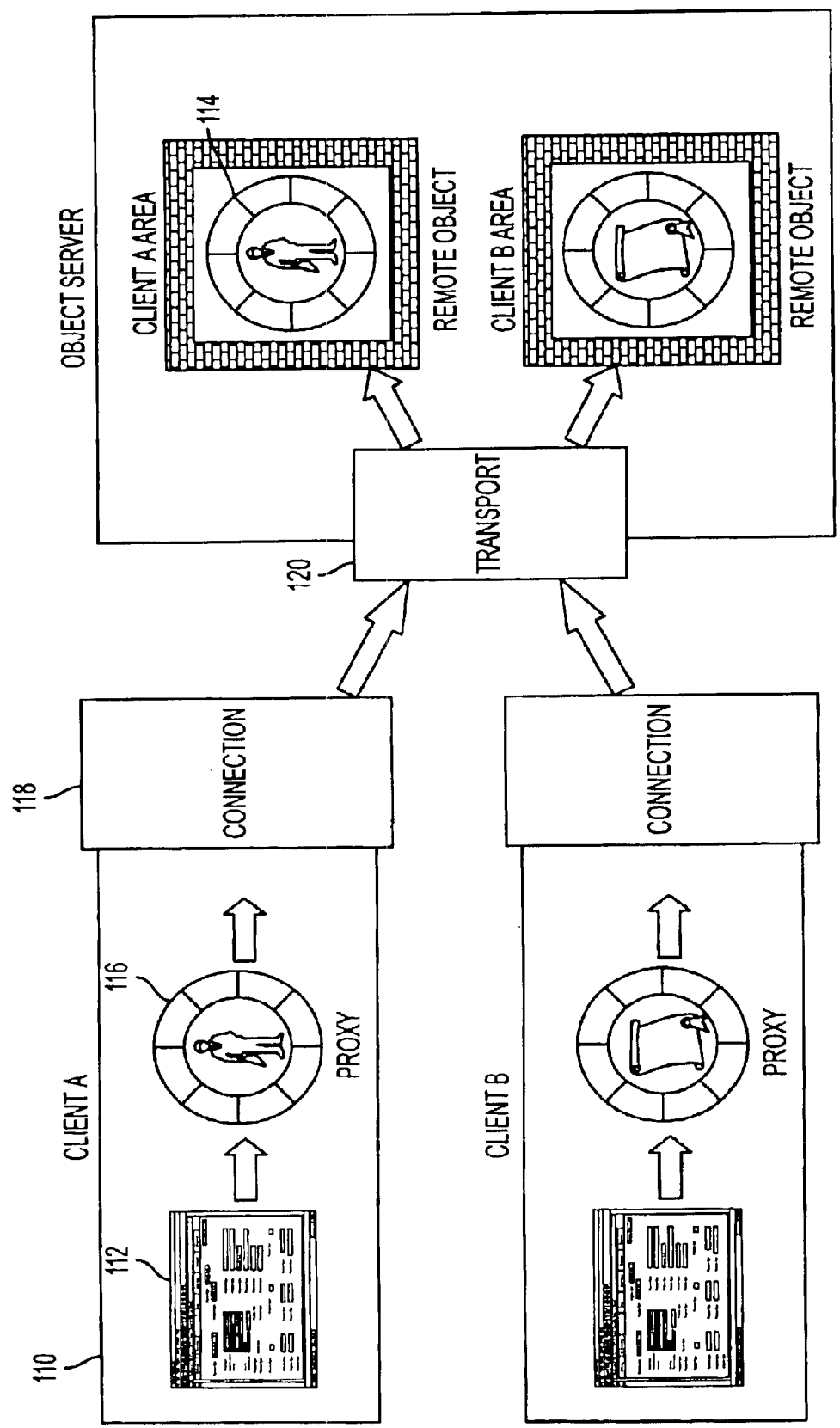
FIG. 4 shows the communication between objects in the invention.

Whenever the user interface needs to instantiate (i.e. create) a business object, it calls 80 a service known as the Object Factory, which performs operations, such as illustrated in FIG. 3. When a request to create an object is received 82 from the user interface 112 (see FIG. 4), the Object Factory accesses an object registry to determine 84 the location of the object. The registry contains an entry for each business object in the system. The registry maps the logical name of the business object (e.g., Customer) to the physical name of the object (e.g., n_cst_busobj_customer) and also identifies the default location (local, distributed) of the object. If the location is not local 86, the object is a remote object 114 and a conventional proxy object 116 is created 88 in the client 110. The proxy object 116 acts as a substitute for the remote object 114 and includes the public methods and properties of the remote business object. A conventional connection object 118 (which was created when the Object Factory was initialized) and a conventional transport object 120 (which was created when the object server was started) link the remote 114 and proxy 116 objects. The remote business object 114 is then executed 90 through the proxy object 116. The remote object 114 runs in it's own protected space with its's own set of global variables.

Figure 5:
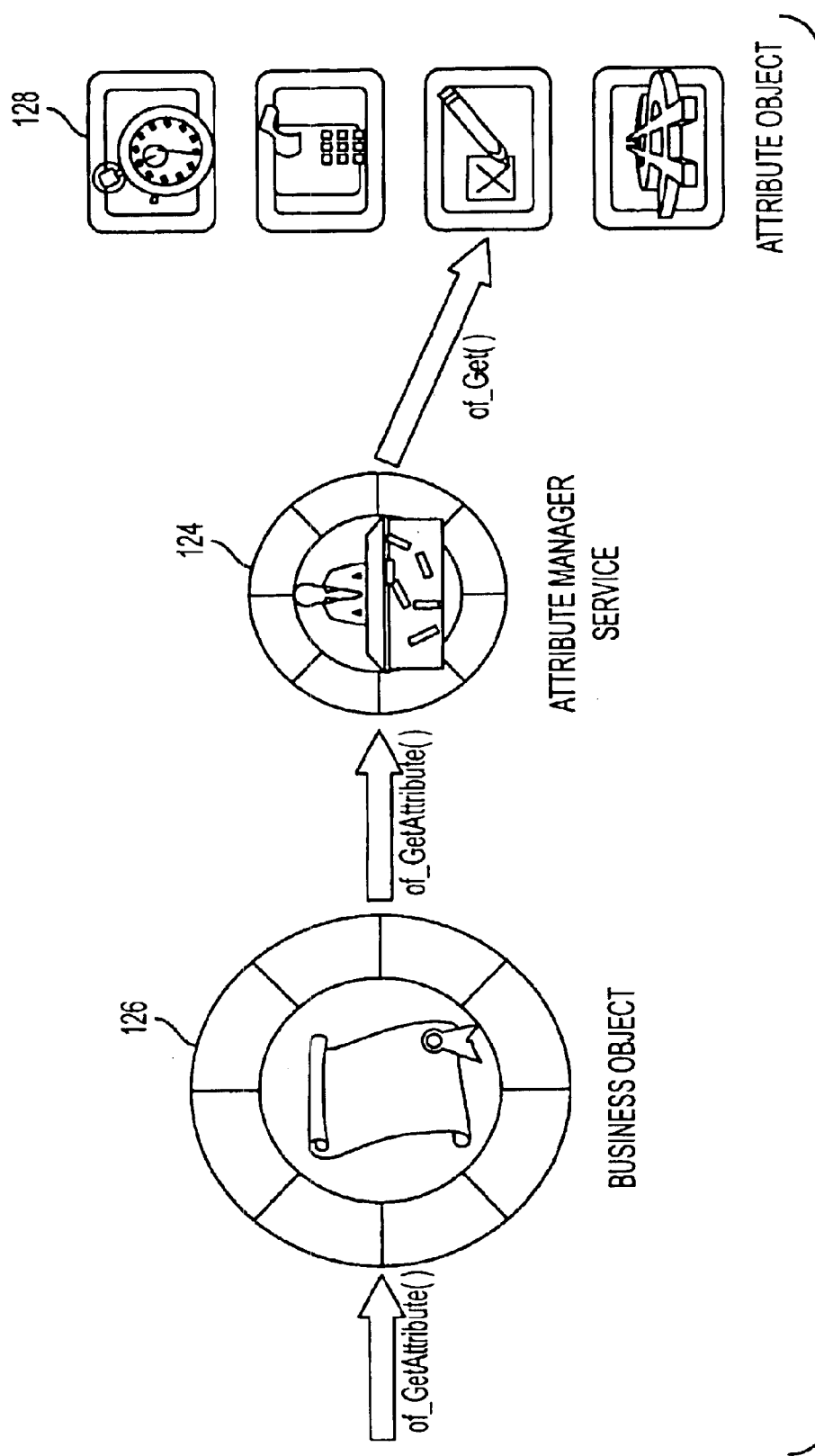
FIG. 5 depict the relationship between an attribute manager service, a business object and attribute objects.

To allow the business objects to be more efficient, the present invention includes an attribute manager service 124, as depicted in FIG. 5. Each business object 126, rather than having to define a "get" method and a "set" method for each attribute, defines generic access methods (get and set) that rely on using the name of the attribute. Each business object also calls an attribute manager service object. The business object essentially delegates attribute operations to the attribute manager. The attribute manager 124 maintains a list of registered attributes and essentially routes the set and get requests to the appropriate attribute object 128. Each attribute object 128 includes the get method for the attribute which obtains the item from the database and translates it into a string which is returned to the business object 126 as well as the set method for this attribute which performs item level edits and stores the item in the database.

Figure 6:
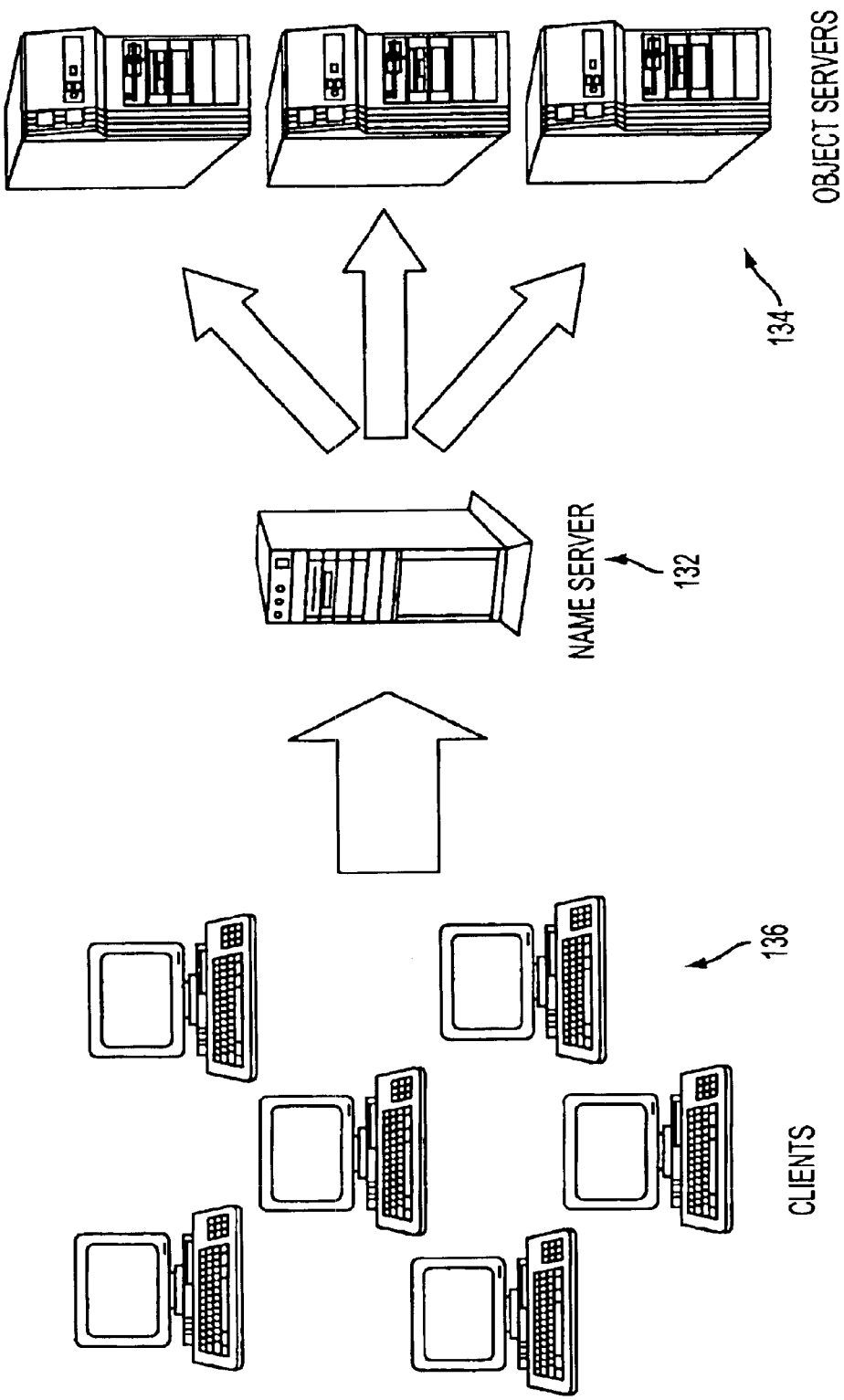
FIG. 6 depicts using a name server to balance work load.

The ability of the invention to distribute the business objects across multiple application servers improves processing efficiency and allows the application to support a greater number of users (as would be required for large, global trade services banks). The system also allows clients to be directed to the application server with the greatest available capacity. This load balancing feature is depicted in FIG. 6. During load balancing, a name server 132 polls the object servers 134 of the system to determine availability and usage. A client 136 connects to the name server 132 and the name server 132 supplies the client 136 with the name and the location of the object server to which the client is to connect. The client 136 then makes the appropriate connection. Load balancing is based on the percent utilization measured as a ratio of current clients to maximum clients.

As previously mentioned, the present invention provides business objects which perform the functions (business logic) necessary to process the trade finance operations. An example of a calculation of fees, commissions and charges, the most complicated calculation in trade finance operations, will be described. Other less complicated operations, such as verifying the terms of an instrument, can be produced by a person of ordinary skill with knowledge of trade finance from the example provided herein starting from a system such as the conventional TradeLine™ system previously mentioned.

The present invention includes a 3-tier object framework allowing for the definition of business objects whose responsibilities are invoked by a set of graphical user interface objects or any other interface. The business objects are responsible for executing the correct business logic, thereby shielding this as much as possible from any interactive or background interface such as the graphical user interface. The business objects are additionally responsible for their own persistence, i.e. communicating with the third tier, the database 64, to store themselves. Sybase's PowerBuilder tool and its PowerScript language along with this three tier object design allow for the design and development of such an object oriented paradigm.

The charge application or object assesses charges, fees, and commissions (from here onward simply referred to as charges) using rules and instructions stored in tables or objects which ultimately store themselves in tables, thus allowing maintenance by the user. Charge preload rules define which type of charges are to be taken based on a multitude of conditions that describe the context of the process, e.g. which product, activity type, terms of the instrument and many more pieces of information. For example, a rule could be defined that would assess an Issuance Liability Charge (charge type) on the Applicant (party type) on all Issuances (activity type) of Documentary Letters of Credit (product). Finding a rule that matches the current scenario will give the system a charge type which it is required to calculate. Within the context of the charge calculation, instructions define how a given charge type is to be calculated. The instructions generally define a course of action to be taken for a specific entity in the system at a specific point in time during processing. When a search for any instruction is invoked, the system will search beginning with the most specific instructions and ending with the most general. The search starts by attempting to find an instruction for the instrument at hand, such as a line of credit instrument, then the customer passed into the search, followed by that customer's instruction group and the customer's country, and finally, the operational bank organization that is processing this instrument. This search hierarchy applies to charge instructions as well as all other instructions. When a charge instruction is found for a given charge type and one of the above-noted five entities, the information in the instruction will define which calculation algorithm or formula to use to determine an actual charge amount.

The invention represents each entity involved in business logic as an object class whose instances store and manage their data and have responsibilities pertaining to their class. In addition to classes with persistent instances which are saved in the database, such as an instrument, a customer, or a rule, there are classes that are non-persistent, i.e. they have responsibilities but no data. These classes are referred to as services. A service is usually used by multiple other classes to perform common logic, or it serves as a means of "outsourcing" complex data for one class whose instances do not always need to invoke certain "responsibilities." By maintaining these responsibilities in a separate service, instances of the class using this service can invoke these responsibilities on demand and do not need to load them upon every instantiation, thereby reducing memory usage and improving performance.

The charge assessment process uses a central service (called Charge service) acting on behalf of an instrument's activities or transactions. This service drives the process of determining which charges to generate, finding the instructions to calculate them, and calculating them. To understand the charge assessment process, it is important to look at the class aggregation involved in this process, i.e. the relationship of objects to one another from a composite/component object point of view. The main classes involved are: Reference Objects including ChargeInstruction and ChargePreloadRule and Transactional Objects including Instrument, Activity, ChargeService, Charge, Formula and Distribution.

Figure 7:
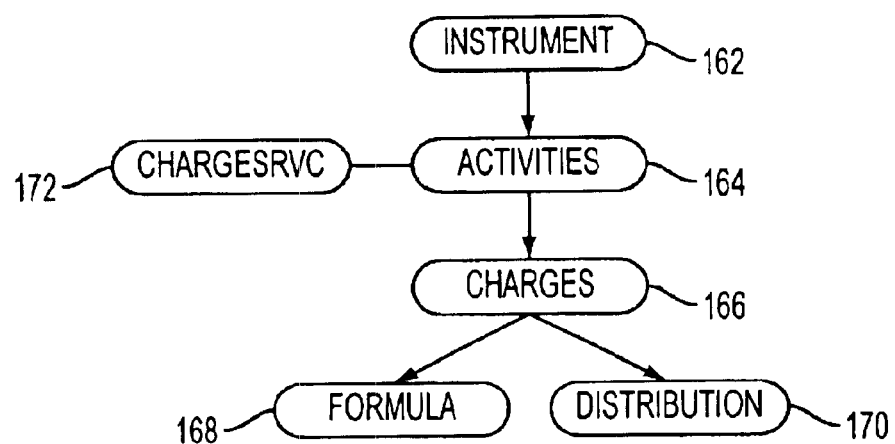
FIG. 7 shows class aggregation and interaction.

Class aggregation and interaction, as depicted in FIG. 7, is as follows. An instrument, for example a Documentary Letter of Credit, has one or more activity components 164. An activity 164, such as an Issuance or Payment, has from zero to many charge components 166. An individual charge 166, for example, a Periodic Commission, has a formula 168 which provides the factors (fixed fee, percentage rate, etc.) used to calculate the charge, and a distribution component 170 assigns the charge to one of the Parties of the instrument (Beneficiary, Applicant). The activities 164 can each instantiate a charge service 172 which will perform the necessary responsibilities to generate charge instances and attach them as components to the activity.

Figure 8:
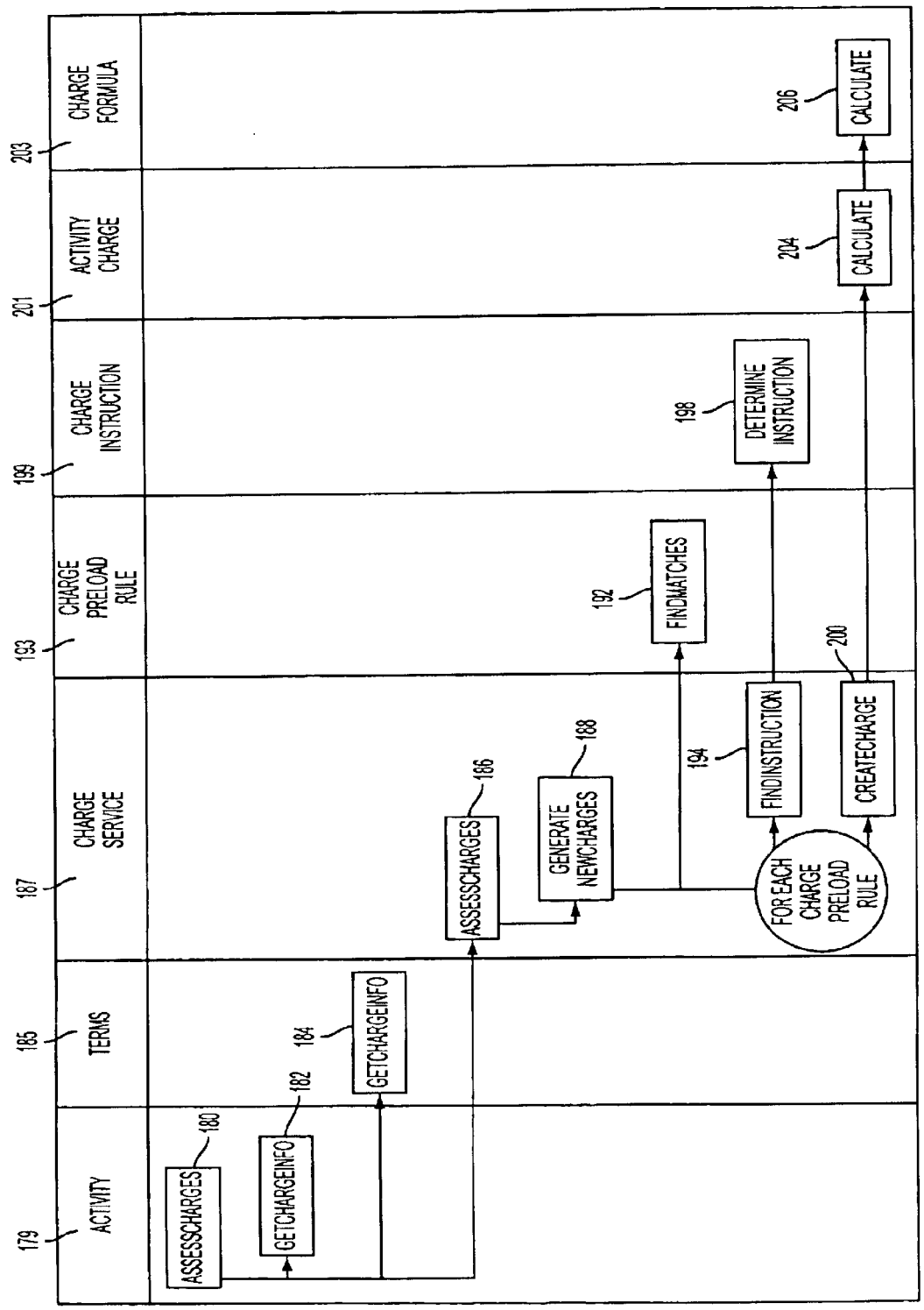
FIG. 8 shows the tables used in charge calculation operations.

FIG. 8 depicts the AssessCharges responsibility on the Activity and the interaction it triggers between objects. After the Verify responsibility of the Activity object successfully validates and cross-edits its data and the data of the Terms object that is associated with it, the Activity Object 179 calls 180 its own AssessCharges responsibility. The AssessCharges responsibility manages the overall flow of the charge calculation process. The first step in this process is to gather the information which will be used to determine and calculate the charges. To retrieve the data which is used in the charge calculation process, the AssessCharges routine calls 182 the GetChargeInfo responsibility on the Activity 179 (itself) and calls 184 the GetChargeInfo responsibility on the associated Terms object 185.

After the required information has been gathered, the AssessCharges responsibility on the Activity instantiates the Charge Service Object 187 and calls 186 the AssessCharges responsibility of the service. The information gathered in GetChargeInfo responsibilities 182, 184 is passed to the Charge Service as a parameter The AssessCharges responsibility on the Charge Service deletes the old charges (if any) on the Activity, gathers some additional information, and invokes 188 the GenerateNewCharges responsibility. The GenerateNewCharges responsibility feeds 192 the information collected previously into the FindMatches class responsibility of the ChargePreloadRule class 193. The FindMatches responsibility identifies the ChargePreloadRules that should be applied. Each ChargePreloadRule retrieved specifies the type of charge to be applied (e.g., warehouse charge, tracer fee, transfer commission, etc.) and the party (e.g., applicant, beneficiary, etc.) to which it should be applied. An example of a charge preload rule table for the ChargePreloadRule object 212 is shown in FIG. 9.

For each ChargePreloadRule returned by the FindMatches responsibility, the actual ChargeInstruction to be applied must be determined. The FindInstruction responsibility is called 194 to perform this task. The FindInstruction responsibility first identifies the Customer that is specified by the ChargePreloadRule. That is, the ChargePreloadRule may have specified that the charge should be applied to the applicant; this responsibility determines that the applicant is Customer "X". Once the appropriate Customer has been identified, the FindInstruction responsibility calls the 198 DetermineInstruction class responsibility on the ChargeInstruction class 199, passing it the charge type (specified in the ChargePreloadRule), the Customer, and the operational bank organization processing the activity. The DetermineInstruction responsibility performs a hierarchical instruction search within all instances of ChargeInstruction to determine if there is an instruction for the specified charge type.

Figure 9:
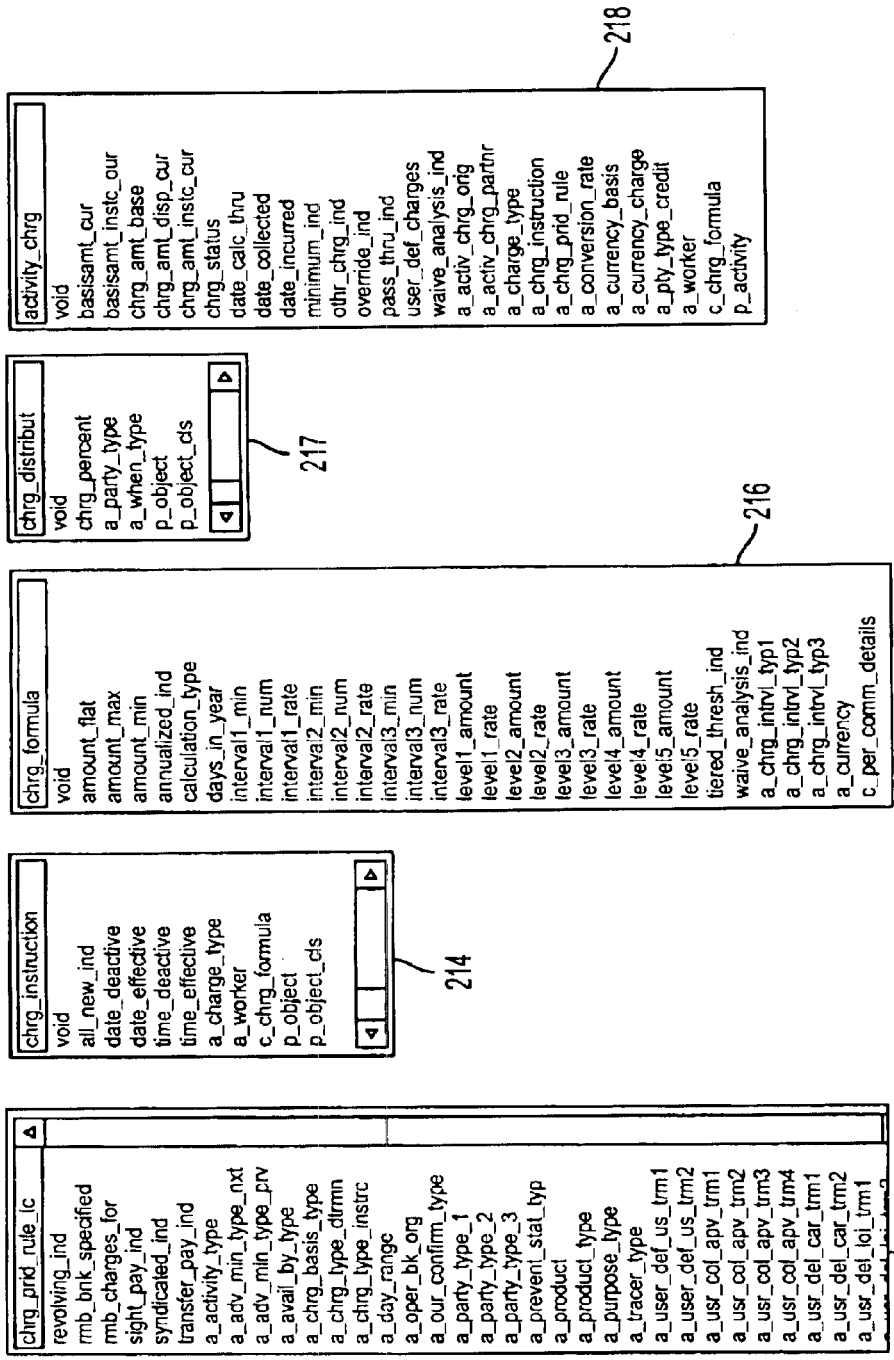
FIG. 9 shows object interaction in a charges calculation operation.

An example of a charge instruction table or object 241 is shown in FIG. 9. Every ChargeInstruction is linked to a ChargeFormula component 216 (which contains the factors used to calculate the charge), as well as one or two ChargeDistribution components (which designates to which party/parties the charge should be applied).

For each ChargeInstruction identified, the CreateCharge responsibility is called 200. CreateCharge creates an ActivityCharge component 201 on the Activity object for the corresponding ChargeInstruction. It also creates a ChargeDistribution component on the newly created ActivityCharge for each ChargeDistribution that was specified in the ChargeInstruction. A ChargeDistribution specifies which party to charge at what time in the instrument's life as well as what percentage of the overall amount this party will need to pay. The ChargeFormula component 203 of the Chargeinstruction is copied over and added as a component object for the ActivityCharge as well.

Finally, CreateCharge calls 200 the Calculate responsibility 204 on the new instance of ActivityCharge. The Calculate responsibility sends Calculate 206 to the ChargeFormula component 203 of the ActivityCharge which uses one of five algorithms to calculate a charge amount. This charge amount is then stored in the Activity-Charge table or object 218 (see FIG. 9) completing the charge calculation operation. Source code for the charge application or object is provided in the included Appendix.

The present invention automates the handling of trade finance transactions. The handling of a trade instrument or transaction involves receiving documents, such as a letter of credit, and processing the documents to create the electronic versions of the document. Even though the electronic version of the document is available, provides such information as the creation date and is satisfactory for various operations with the document, such as answering customer service inquiries, it is often helpful to have the original document available for review. To provide the ability to view the documents from any location in the system, the present invention captures the document as an electronic image and links the document image to the electronic version of the document or work item and also links it to the instrument. For example, a letter of credit application document is imaged and linked to the work item assigned for processing the document and linked to the issuance transaction of a given instrument. The process of providing imaging and work flow capabilities in trade finance is described below.

Figure 10:
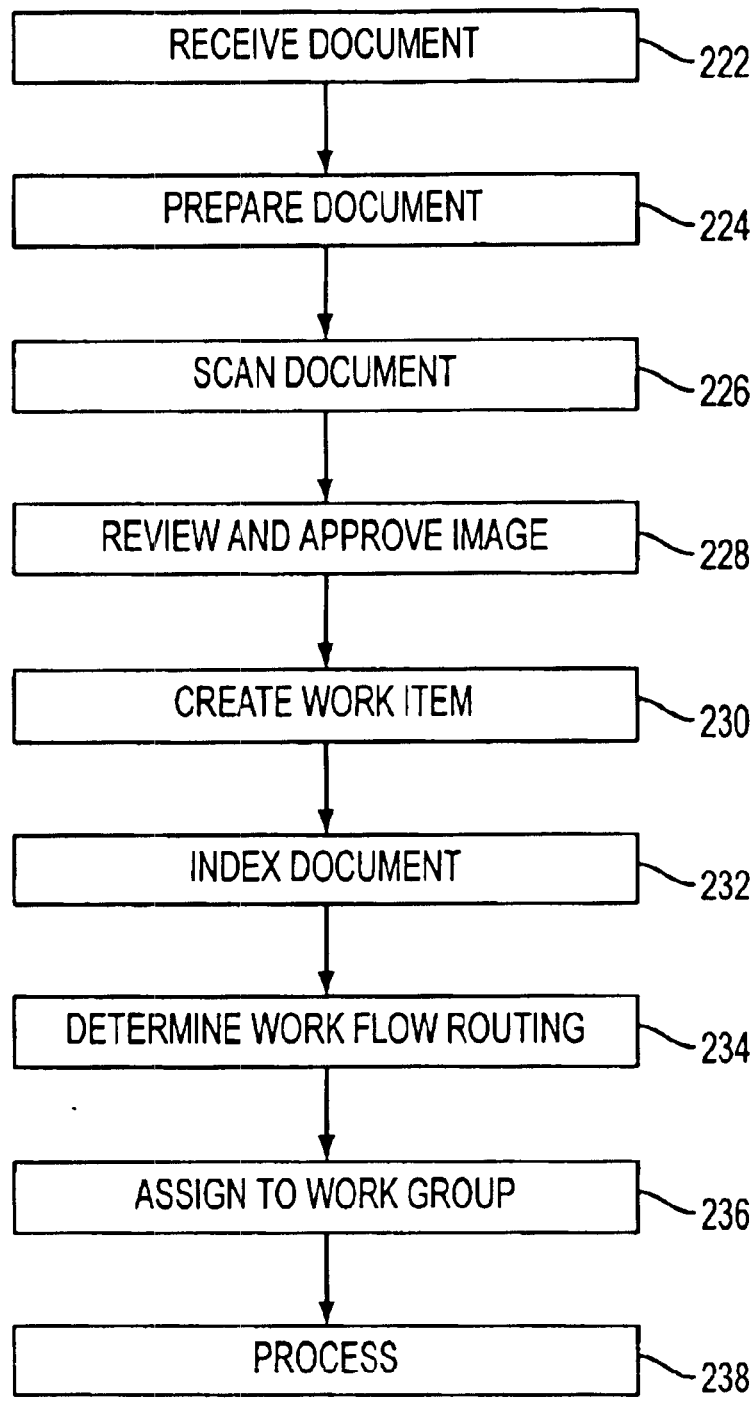
FIG. 10 depicts determination of work flow routing.

Numerous different types of documents can be received 222 (see FIG. 10) and scanned by the scanners 22 and 42 of the system. Paper documents can be scanned, such as a letter of credit application, an amendment request or a collection order. Free format messages can also be received, such as a customer change of address request. These documents are prepared 224 for scanning by a document preparation clerk and then scanned 226. The electronic version of the document is then reviewed 228 and if satisfactory approved for entry into the system. If it is not satisfactory it can be scanned again. The document is then assigned 230 a work item identifier or document ID by FileNet. At this stage in the processing any documents that have been received electronically (such as SWIFT, Telex, Facsimile, etc.) also enter the process. Electronic documents can include standard documents, such as advice of payment, advice of acceptance, etc. as well as free format messages, such as SWIFT799.

Figure 11:
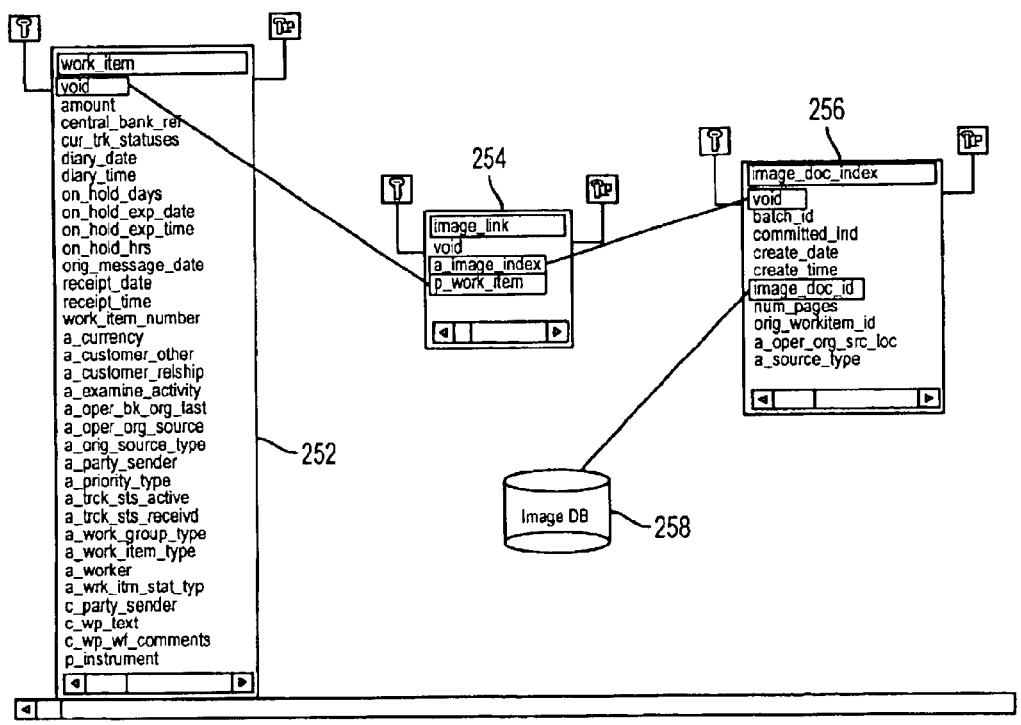
FIG. 11 shows the objects that link a document to an image of the document.

The next step 232 is to index the document to establish a link between the electronic version that will or has already been created and the image. This index is typically created under manual control with a review of the image being used to update information of the work item from the document to "complete" the work item and make it ready for processing. For example, the reviewer would look at a letter of credit amount and who it is coming from and enter this information into the work item. The completion of the data of the work item completes the tables that provide the linkage. The linkage between work items and an image is accomplished through three business objects within the system. These are Work_Item, Image_Link, and Image Document_Index. The tables 252, 254 and 256 which store the data for each of these three business objects and which provide a link to an image 258 are shown FIG. 11.

As previously mentioned, when an image is scanned, it is assigned a document ID. The document ID is preferably up to 20 characters long and is used to uniquely identify the image. After the document ID for the image has been assigned, an Image_Document_Index object is created and stored in the Image_Doc_Index table 256 to track the image from within the system. In addition to storing information about the image (e.g., when it was scanned, how many pages, what batch it belongs to, etc.) the Image_ Doc_Index table 256 stores the document ID in its image_ doc_id attribute. This attribute is used by the system whenever it wants to retrieve the image from an imaging server 24/44 for viewing via FileNet. Work items are stored in table 252 and images (Image_Document_Index objects) are linked to work items via Image_Link objects stored in table 254. Image_Link objects contain the ID (e.g., unique key) of the Image_Document_Index (in the a_image_index attribute) and the ID of the Work Item (in the p_work_item attribute).

Once the document has been indexed it needs to be assigned to a worker or work-group for processing. A work group can be local or spread over a number of different locations in different time zones. To assign the document to a work-group, the system determines a work flow routing 234 (see FIG. 10). A distribution rules table 270 (see FIG. 12) is used to determine where a work item is routed for processing within the system. That is, once the work item is created, which work group 272 and worker 274 to which it should be assigned to for processing is determined. Based upon information specific to the work item (customer 276, activity 278, product 280, product type 282, and bank organization 284), the system attempts to find a matching distribution rule. In searching for a distribution rule, the system starts by looking for an exact match between the rule and the work item and then gradually relaxes its criteria so that a more general distribution rule can be found.

The system starts by looking at distribution rules that are defined specifically for the customer to which the work item applies. Within the set of distribution rules defined for the customer, the system attempts to find a match between the rule and the work item using the following preferred order of attempted matches: 1. product, product type, and activity; 2. product and product type; 3. product; 4. activity; and 5. default rule for the customer. If no distribution rule is found using the customer match, the system then searches for distribution rules that have been defined for the bank organization associated with the work item. Within the set of distribution rules defined for the bank organization, the system attempts to find a match between the rule and the work item using the same match order noted above with the default (match 5) being the default rule for the bank organization. When a matching distribution rule is found, the work item is assigned 236 (FIG. 10) or routed to the work group specified by the rule. The rule may also identify a specific worker to which to route the work item. If it does not, it is routed to the "default" worker for the work group. If no matching distribution rules are found, the work item is routed to the default work group which is identified by a global system setting. The routing involves placing the work item on a list of the work items for the work group.

Once the routing or assignment has been completed the work item (received document) will be processed 238. During the processing of the work item a list of documents associated with the work item is displayed to the worker. Each document on the list includes a hard link (the index) to the image of the document. When the user selects the document (double clicks on the list item), the system (FileNet) uses the index to access the images in the image server, retrieve the image of the index and put the document in a document view window of the interface.

The present invention allows customers to be treated differently, with more "valuable" customers receiving a higher level of service. The system of the present invention helps provide these levels of service by assigning different due dates based on customer service level. An out-by-date table 290 (see FIG. 13) is used by the system to determine the due date for each work item received. The logic for identifying the out-by-date rule to apply is the same as that used for finding a distribution rule. Once the out-by-date rule to use has been found, the due date for the work item is calculated. If no cut off time 292 is specified in the rule, the day increment 294 and hour increment 296 are added to the current business date and time to determine the due date. If a cut off time 292 has been specified, and the work item is received before the cut off time (e.g., before noon), the prior day increment 298 and prior hour increment 300 are added to the current business date and time to determine the due date. If a cut off time has been specified, and the work item is received after the cut off time (e.g., before noon), the post day increment 302 and post hour increment 304 are added to the current business date and time to determine the due date.

When an individual worker is to select a work item for processing, the worker can view a work in progress window such as depicted in FIGS. 14A and 14B. This window includes a number of fields. Instrument Number field displays the unique identifier for the instrument. The number appearing here can be manually entered, or automatically generated by the system, when a new work item is entered. The purpose of the Work Item Type field is to define the type of work item and is specified when entering the new work item. Activity Type field displays the type of activity to be created from the work item, or for the specified product. The Sequence Number field shows the order in which activities were created for the specified instrument and is designated by the value shown here. For example, a payment activity with an Sequence Number of 2 was created before a payment with a Sequence Number of 4. The Activity Status field provides the full description of the activity's current status. The Current Status column shows abbreviations of the statuses that currently apply to the work item (or activity created from a work item). Most of the time there is only one current status; however, often there can be multiple current statuses. The system automatically assigns a tracking status to indicate that the bank received a work item, initiated on-line processing, completed interim processing, and finally released the work item. In addition to the statuses the system adds automatically, a tracking status line can be manually entered to provide other workers with additional information. For example, if a letter of credit requires signature verification, a status line could be entered indicating that the application was sent for verification. The system automatically dates and time-stamps all updates, providing the bank with an accurate summary of events associated with the work item. The Due Date field shows the date when the activity is due to be released. The Due Time field displays the time of day, on the specified date, when the activity is due to be released. The Product field shows the type of trade instrument. The Product Type field is used to further classify the product. For example, it might be used to indicate a directional classification for the product, such as Import or Export, Incoming or Outgoing (from the bank's perspective of this instrument). The Relationship Customer field shows whether the instrument party maintains a relationship with the bank. The Priority field includes entries that designate the priority of the work item or activity. Items with high priority should be completed before those with normal or low priority designations. The Currency field shows the currency in which the amount of the work item or activity is denominated. The Amount field shows the amount of the activity, originally specified in the work item that initiated the activity. The Activity Detail Type column shows details that further clarify certain types of activities including tracers, adjustments, liquidations (for example, for a tracer activity the Activity Detail Type describes the type of activity; for a liquidation activity the Activity Detail Type indicates whether the liquidation was on-line or automatic).

Figure 15A:
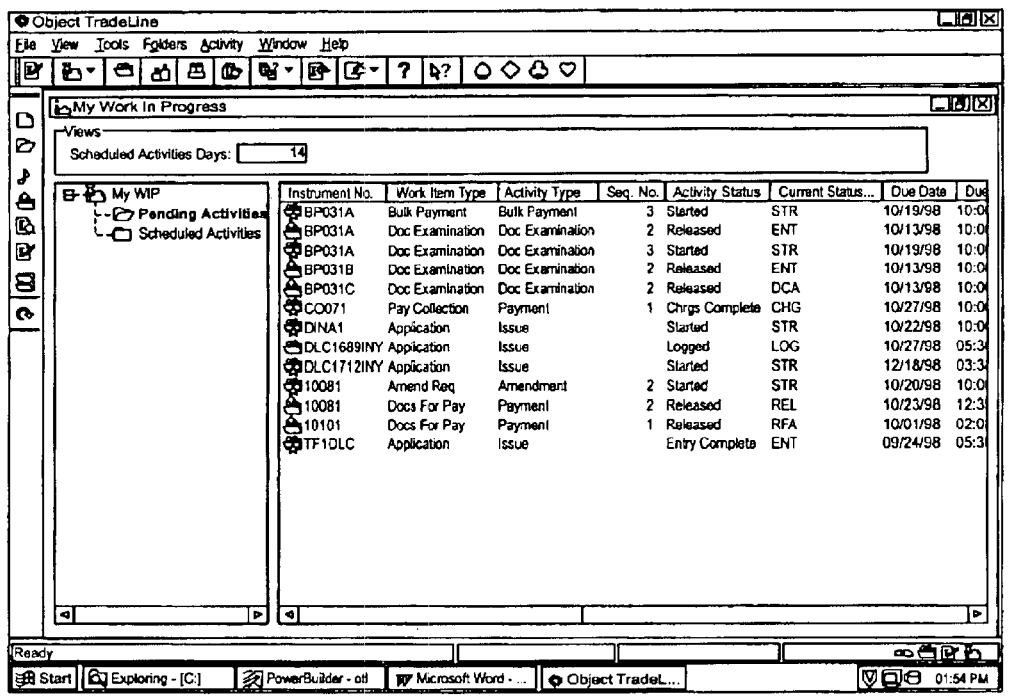
FIGS. 15A–15G show windows used by a customer service representative.
Figure 15B:
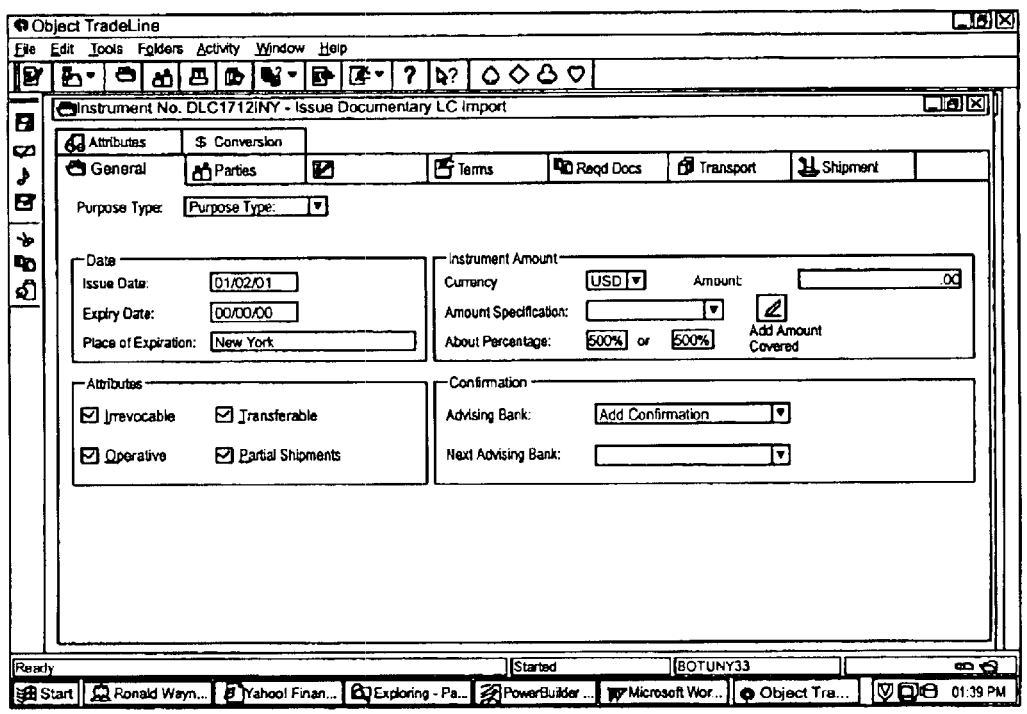
Figure 15C:
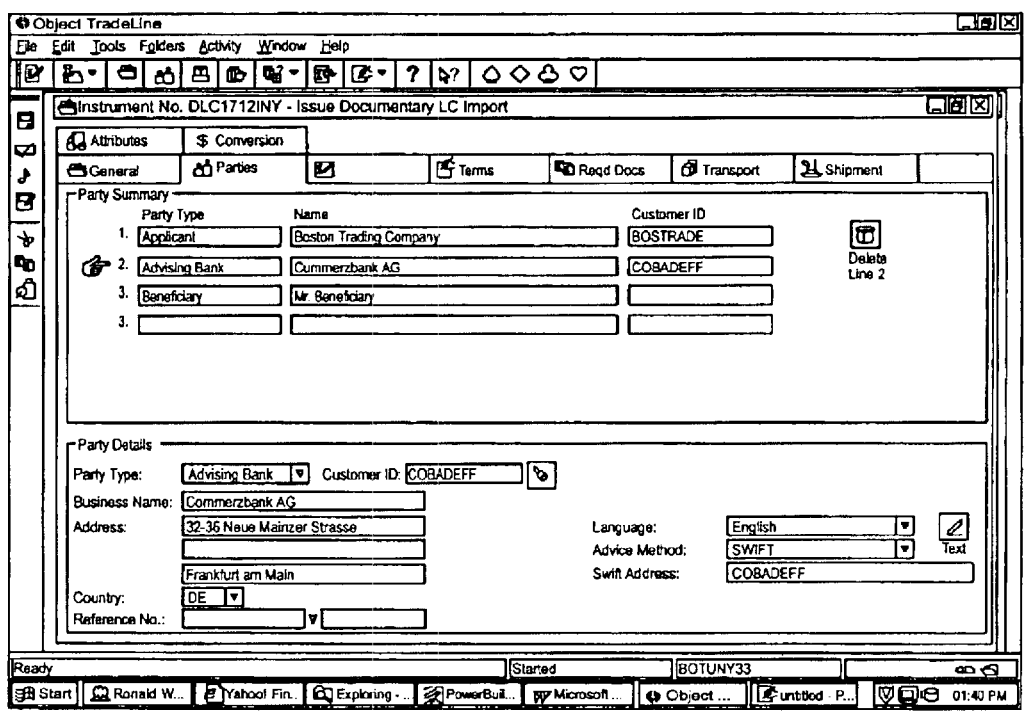
Figure 15D:
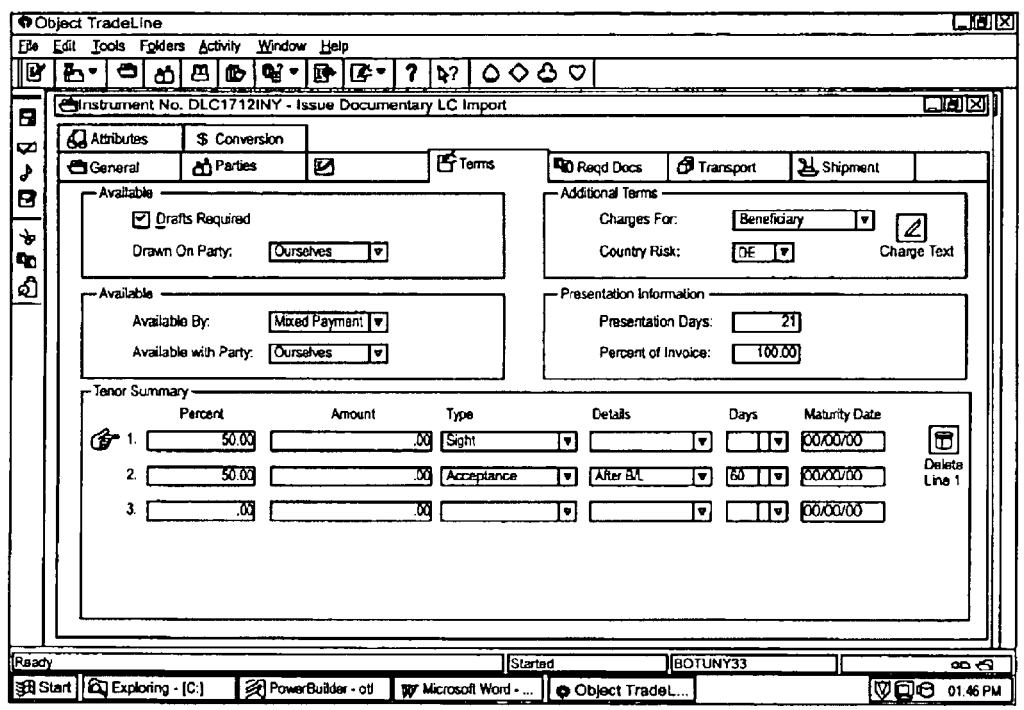
Figure 15E:
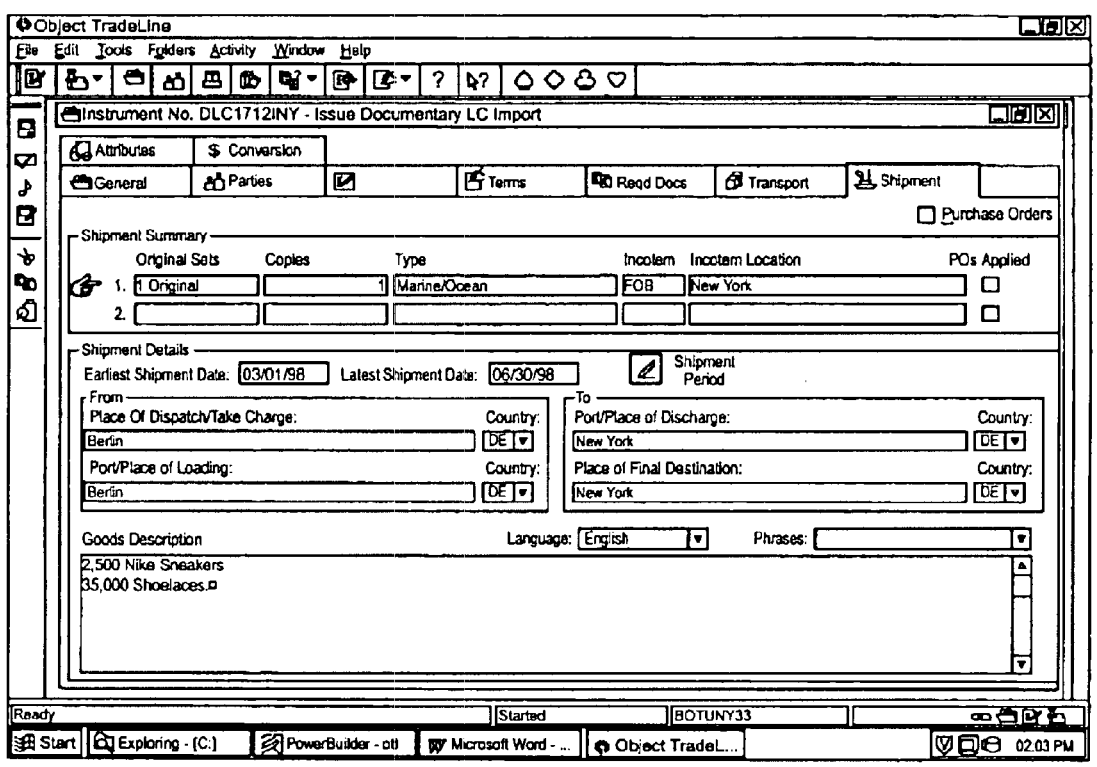
Figure 15F:
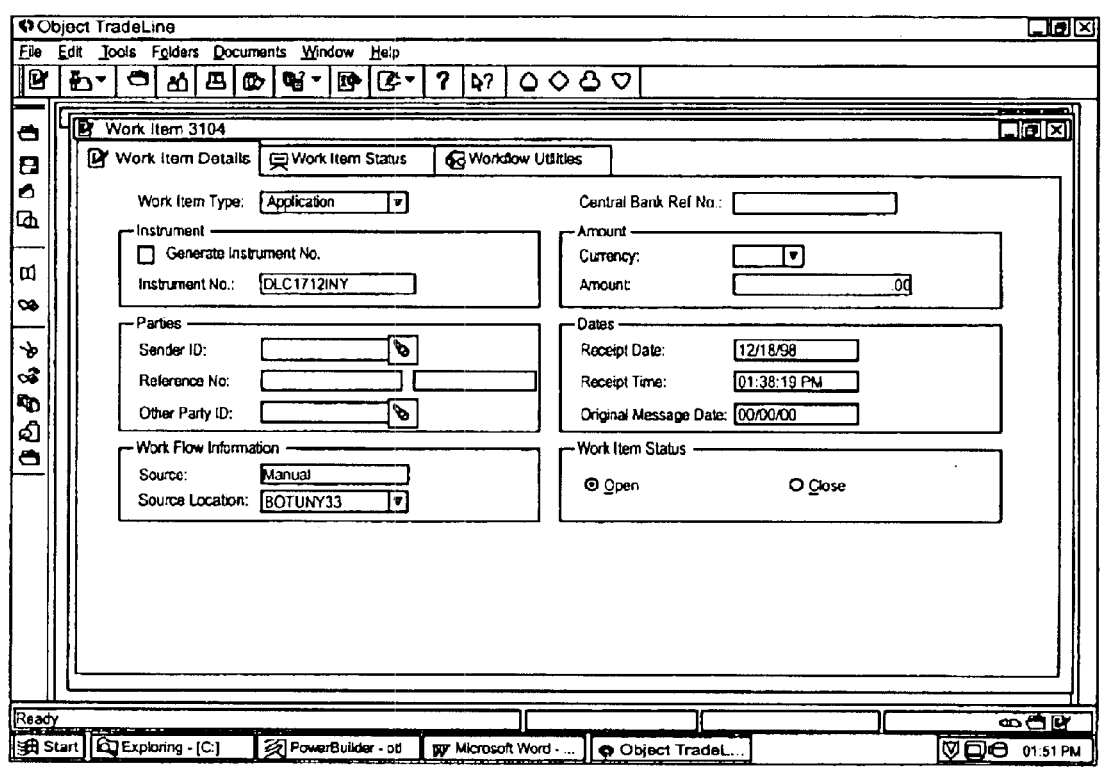
Figure 15G:
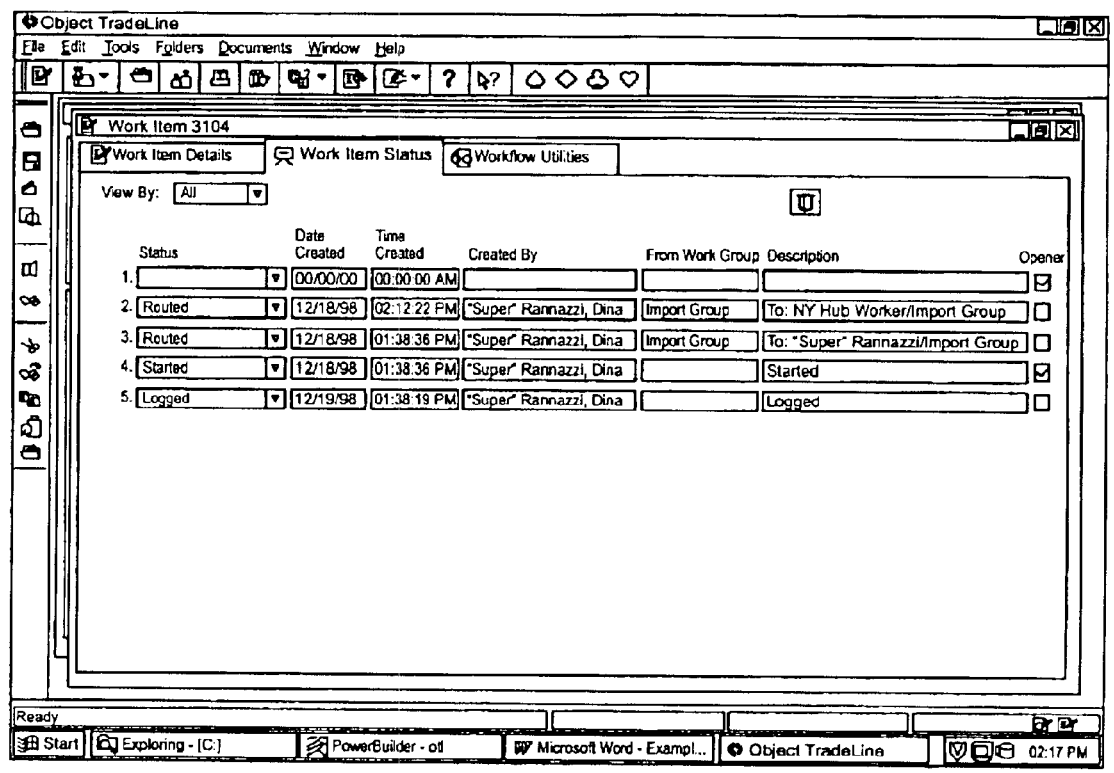

When an individual worker or customer service representative operates in a windows environment, different information about a work item can be displayed, entered, updated and changed like the environment found in conventional finance packages. In the case of this trade finance system the representative could use a series of screens such as in FIGS. 15A–15G. FIG. 15A is the work in progress window that shows all of the Activities assigned to a customer service representative for processing. A user selects an Activity to work on by double clicking on it or by using the Open menu item/toolbar button. When the user opens the Activity, the Activity Folder window of FIG. 15B is displayed. The terms and conditions of the Activity are logically organized in various pages within the tab folder. The General tab (shown here) provides some very high level information about the activity. The Parties tab page (see FIG. 15C) lists the customers, banks, individuals, that are legal parties to the resulting Letter of Credit, Payment, etc. The Terms tab (see FIG. 15D) for the Activity Folder provides the detailed financial information relating to the Activity. The Shipment tab page (FIG. 15E) shows how the goods will be shipped to the recipient along with a description of the goods. From the Activity folder, the representative can open the Work Item folder shown in FIG. 15F. This is done by selecting the "View Work Item Tracking" menu option (see FIG. 15E— View Work Item Tracking toolbar button on the left side of the window—fourth button down from the top and looks like a pencil writing on a piece of paper). The Work Item folder shows information pertaining to the application, correspondence, etc. which resulted in the Activity being generated. All Activities are associated with a work item, however, not all work items will result in an Activity. The Work Item Status tab (FIG. 15G) of the Work Item Folder shows everywhere that the Work Item has been routed for processing and every activity that has happened on the work item.

The present invention, as previously discussed, allows the hub and spokes of the system to be geographically disbursed, for example, across multiple time zones. This allows the invention to take advantage of the differences in the hours of the work day in different countries, so that the processing of trade finance instruments can be performed around the clock (24 hours). For example, when processing stops at the end of the business day in New York the processing can continue in Hong Kong. This is particularly important in a system such as the present invention where different customers can have different guaranteed completion times (levels of service) for their work.

In a global processing environment there may be more than one time zone involved when processing an individual piece of work. Thus, it is necessary to determine the date and time context for a given work flow item, instrument, or reference data update, that will remain consistent regardless of the physical location of processing.

Figure 16:
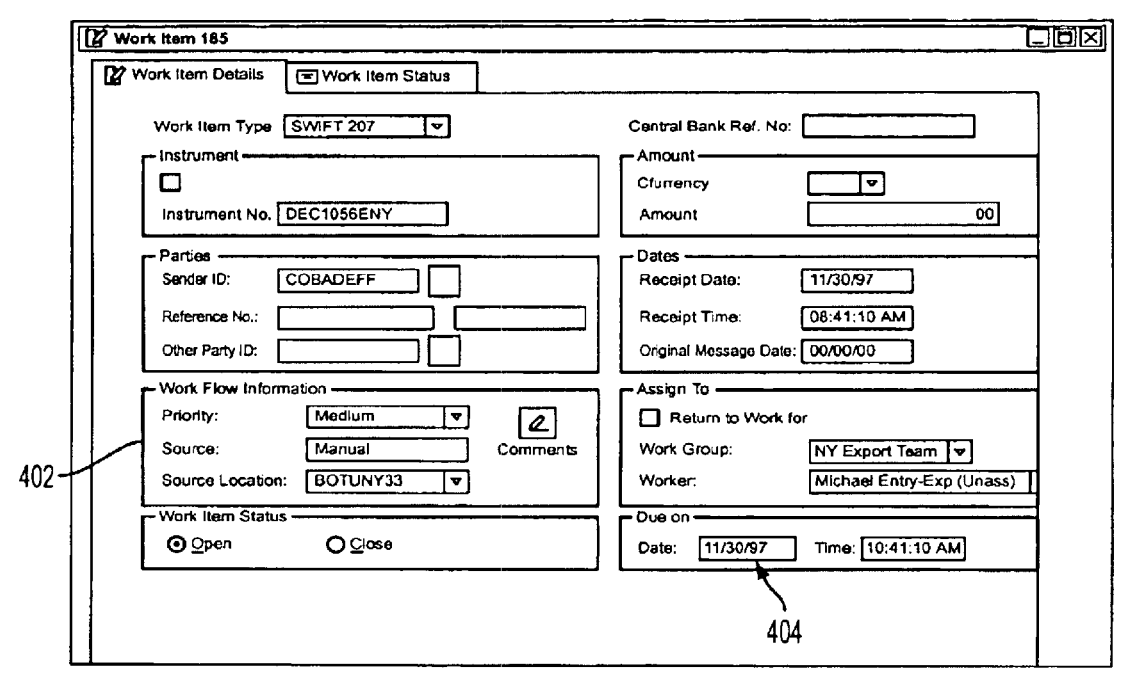
Figure 17:
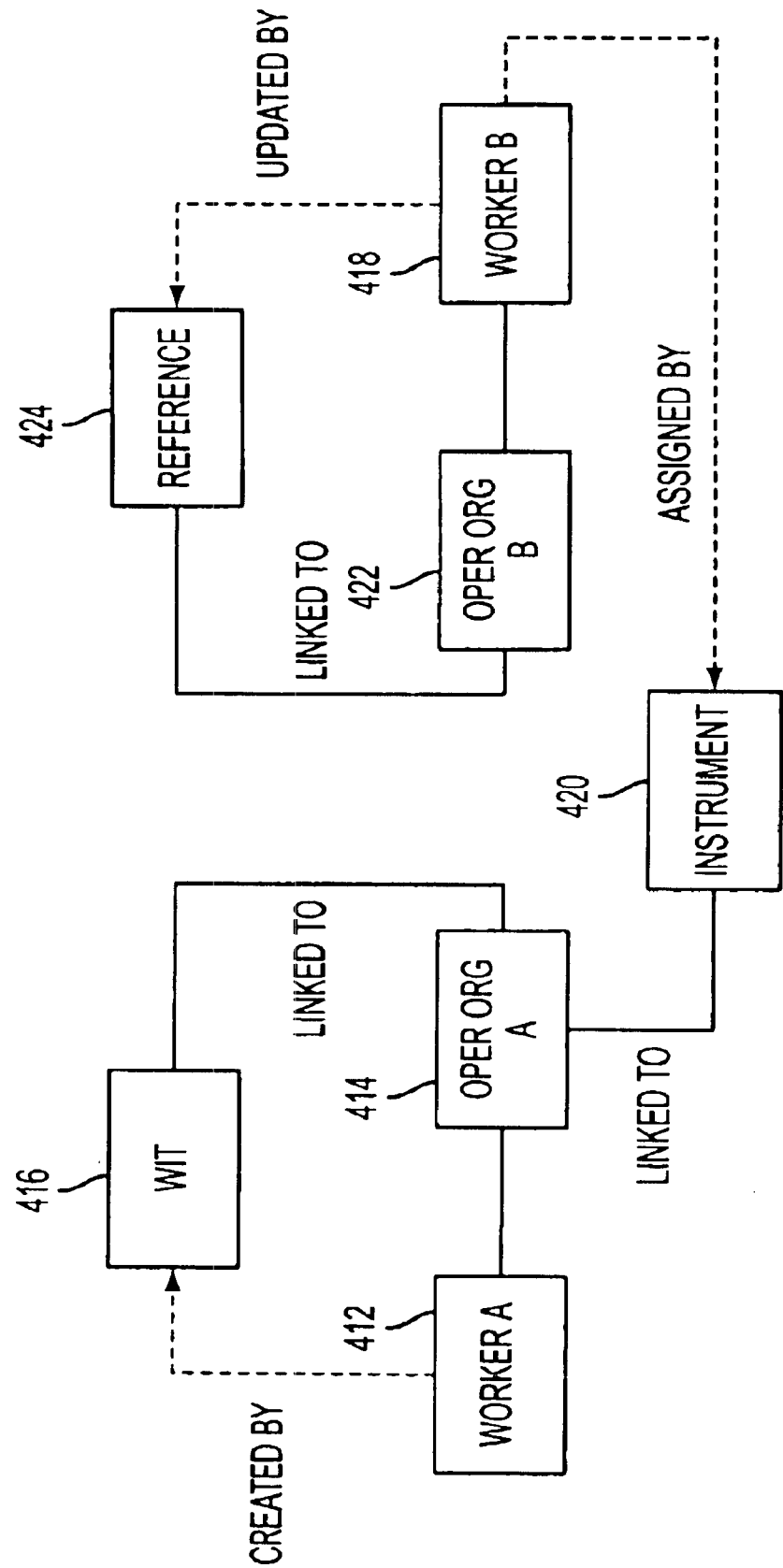
FIG. 17 shows the relationships between workers, organizations, work items, instruments and reference data.

For a work flow item the date and time is tracked from the point of receipt, the business date is determined from the calendar of the indexer of operational organization while the actual date and time is determined from Greenwich Mean Time (GMT) and the differential of the indexer's operational organization or the source organization. The source location 402, (see FIG. 16) is an operational organization associated with the point of receipt. This identifies the starting point of the work flow item and thus sets the context for date and time for the life of this item. The due date and time 404 are calculated in this context. FIG. 17 depicts the relationship between a worker 412, an operational organization 414 and a work item 416.

For an instrument, the date and time can be set to the customer's or bank's desired date and time, the business date is determined from the calendar of the operational organization of the instrument which is assigned at creation, and the actual date and time are determined from the GMT and time differential of the operational organization of the instrument. The time and date of the instrument remains constant throughout the life cycle of the instrument. FIG. 17 depicts the relationship between a worker 418, an instrument 420 and an organization 414.

The date and time of reference data is set to the date and time of the reference worker, the business date is determined from the calendar of the operational organization of the reference worker and the actual date and time is determined form the GMT and the time differential of the reference date worker. FIG. 17 depicts the relationship between an operational organization 422, reference data 424 and a worker 418.

An operational organization is assigned to a business calendar that defines the business and non-business days of the organization. This calendar is used to update the previous, current and next business dates of this organization. The organizations differential from universal (GMT) time is also kept.

Figure 18:
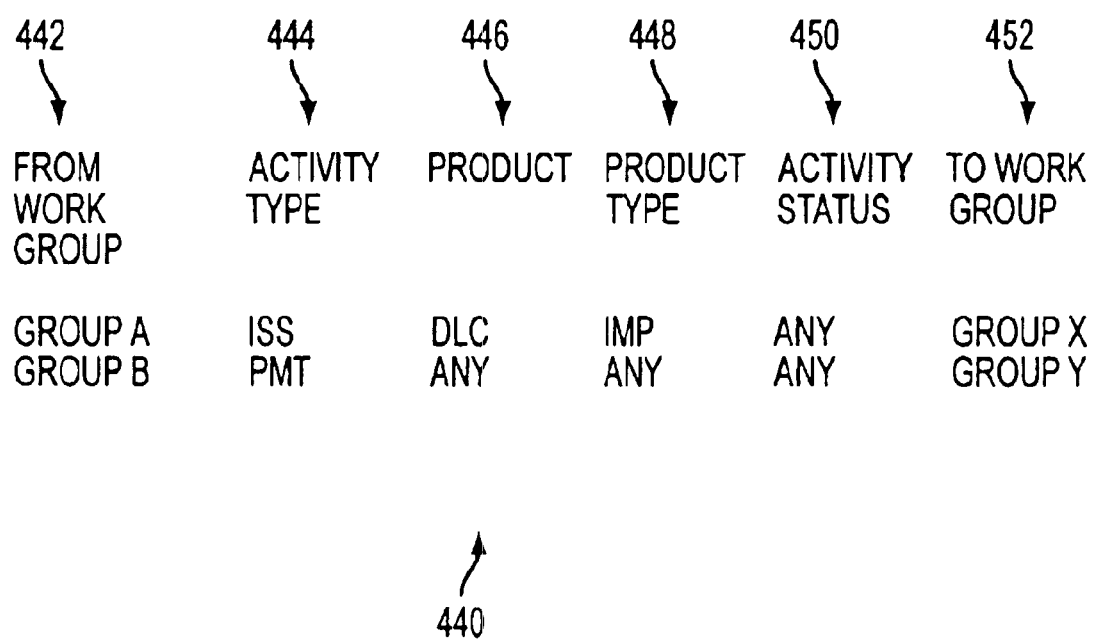
FIG. 18 is a rollover rules table.

The determination of time and date context for work items, instruments, reference data, workers, and operational organizations allows the present invention to perform automatic rollover of work which needs to be performed from one work-group to another. This is accomplished using a rollover rules table 440 as depicted in FIG. 18. This table identifies the rules to be applied when deciding whether or not to re-assign work to another group. In the table From Work Group 442 identifies the group currently assigned the work. Activity Type 444 notes the type of activity to be reassigned. Product 446 defines the product of the work to be reassigned. The Product Type field 448 identifies the product type of the work to be reassigned. Activity Status 450 notes the status of the work to be reassigned. To Work Group 452 indicates the work group to which to reassign the work. For example, the first row in the table of FIG. 18 specifies reassignment of work items from Group A to Group X if they are Issuances (ISS) or Documentary Letters of Credit (DLC) for Import (IMP), regardless of status (e.g. started, verified, ready to release, etc.) The second row causes reassignment of all Payment work items from Group A to Group Y.

Figure 19:
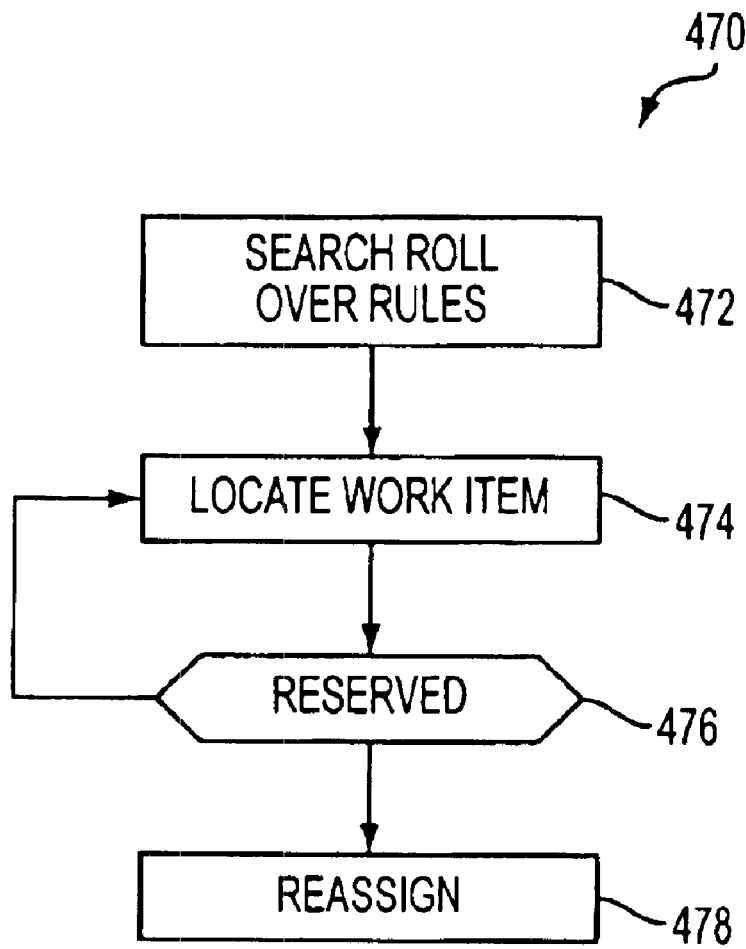
FIG. 19 shows a reassignment operation.

The normal end-of-day processing (which is typically a batch operation) for a work-group, includes a roll-over task 470 as depicted in FIG. 19. The roll-over task searches 472 through the roll over rules (defined above) for the work-group being processed. When a rule is located, the roll-over process searches 474 to see if there are any work items that meet the criteria specified by the rule. For each work item located, the roll-over process checks 476 to see if the work item was reserved by someone in the current group. This might be the case if someone was working after hours. If the work item was not reserved (most likely the case) then the roll-over process reassigns 478 the work item to the new work-group by placing the work item on the list of work items for the new group. The reassignment process preferably creates a tracking status record for the work item showing how and when it was reassigned.

Figures 20A, 20B:
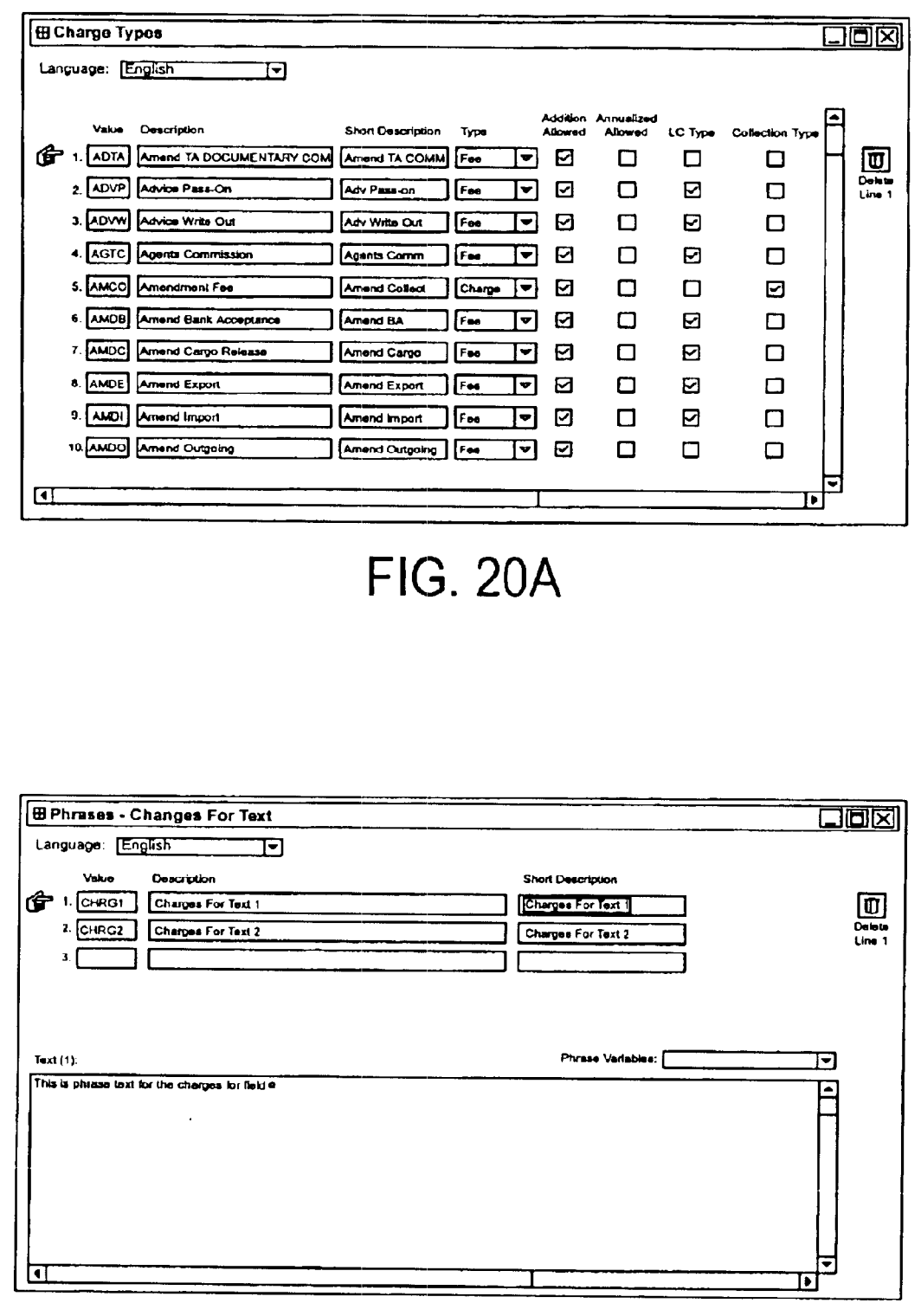

The present invention also provides for the ability to present the user with trade finance information in the language of choice, further enhancing the global nature of the system. This is depicted in FIGS. 20A and 20B. These figures show the language selected being depicted in a window field. With this capability all drop down code lists (FIG. 20A) and text phrases (FIG. 20B) can be provided in a desired language. The text labels on the user interface can also be translated using a utility provided via PowerBuilder 6.0 that dynamically changes all text on screens to a desired language.

Figure 21:
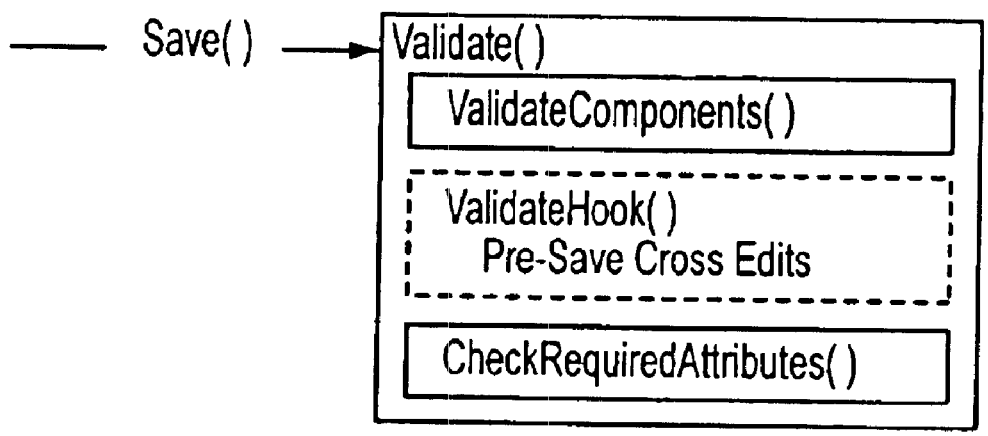
FIG. 21 illustrates a hook for additional code.

The object-oriented design methodology used to develop the present invention allows the system to be modified quickly and efficiently to adapt to changing business conditions and/or technological trends. The major object-oriented features of the system which enable this are discussed below. The features discussed can be applied by anyone with normal skill in the art of object-oriented design and development. The system is based upon an Object Class Hierarchy which places common code in ancestor objects. Descendant objects inherit from the ancestor objects and take advantage of the Ancestor's responsibilities and attributes, without duplicating the code. For example, all activity objects within the system (Issuance, Payment, Examination, etc.) inherit from a single, generic Activity object. The generic Activity object contains the attributes and responsibilities which are common to all activities. If a change should be required to the all activities, it can be implemented in the generic Activity ancestor, without any changes required to the several descendant. If a new Activity was desired by the market place, it could be inherited from the existing generic Ancestor, thereby decreasing the time and effort required to develop it. The system uses a Service based architecture consisting of many reusable services which objects can enable (e.g., use) if they require that service. The Charge Calculation service and the Attribute Manager service, which were discussed earlier are two examples of services used in the system. Other services include Reservation, Error Processing, Security, and Auditing. The system makes extensive use of Component objects which are re-used to build more complex aggregate objects. For example, the Address object is reused as a component of the Customer object, the Party object, the Bank object, etc. The Terms object is reused as a component of a Documentary LC, a Standby LC, or a Collection. An additional example of Class Aggregation, relating to Charge Calculation, is show in FIG. 7. The use of aggregation enables new objects to be created quickly by assembling existing components. New products, for example, can be constructed using existing Terms, Activity, and Work_Item objects. The system has "hooks" built into the responsibilities of each ancestor object which enable descendent objects to add code at specified points in the processing sequence without altering the ancestor's code. For example, the Validate responsibility on the generic Business Object class performs several functions (e.g., required attribute checking) which are applicable to all business objects. However, a major portion of the logic required during validation is unique to the specific business object performing the validation. To account for this, the ancestor business object calls a place-holder responsibility (e.g., hook) as part of the Validate responsibility. The descendent object can then place validation logic in this hook to implement its own cross-edits and validations. FIG. 21 shows the hook implemented for the Validate responsibility.

The present invention has been described with respect to having hub and spoke rings, the components could all be located on a single ring or the components could be arranged in a star arrangement. The various processes have been divided among a number of different servers, however, the processes could all be performed on the same machine.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An international trade finance system handling international trade finance transactions, comprising:

geographically remote back office commercial trade finance spoke user access locations providing access to the transaction financier staff and to international commercial trade finance work items corresponding to the trade commerce transaction financing and comprising issuances, advisements, amendments and payments; and a single consolidated centralized hub processing location having one or more computers processing all the commercial trade finance work items across multiple bank organizations, coupled to said remote locations and consolidating back office processing of the work items in real-time with constant processing availability by using workflow routing between the locations as they become available for handling the work items and using a consolidated computer database in processing the work items, the database having multiple base currencies each base currency corresponding to a country source of the transactions.

2. An international trade finance system handling international trade commerce transaction financing, comprising:

remote spoke user access locations providing access to international trade finance work items comprising issuances, advisements, amendments and payments, and located in different time zones; and a single consolidated hub processing location having one or more computers coupled to said remote locations and providing back office processing of the work items across multiple bank organizations, across the different time zones in real-time using a consolidated computer database in processing the work item, the database having multiple base currencies, each base currency corresponding to a country source of the transactions.

3. An international trade finance system handling international trade commerce transaction financing, comprising:

a user interface providing access to international trade finance work items comprising issuances, advisements, amendments and payments and a document image related to the work item to the transaction financier staff; and a single consolidated processing system providing back office processing of the work item across multiple bank organizations in real-time and providing the image of the document with constant processing and image availability using a consolidated database in processing the work item, the database having multiple base currencies, each base currency corresponding to a country source of the transactions.

4. An international trade finance system handling international trade commerce transaction financing, comprising:

a user interface providing access to international trade finance work items comprising issuances, advisements, amendments, and payments to the transaction financier staff; and a single consolidated processing system providing twenty-four hour seven day a week back office processing capability for the work item across multiple bank organizations in real-time using a consolidated database in processing the work item, the database having multiple base currencies, each base currency corresponding to a country source of the transactions.

5. A system as recited in claim 4, wherein work item processing is referenced to a global system time.

6. An international trade finance system handling international trade commerce transaction financing, comprising:

a user interface providing access to international trade finance work items comprising issuances, advisements, amendments, and payments; and a consolidated processing system providing constant processing availability of back office processing of the work item across multiple bank organizations in real-time using business objects having an object hierarchy with common code in ancestor objects, reusable service objects providing services only, reusable component objects and hooks within the objects allowing addition of code without altering the common code and using a consolidated database in processing the work item.

7. An international trade finance system handling trade commerce transaction financing, comprising:

geographically distributed processing locations, each location including user work stations having a trade finance interface initiating execution of a business object; and a consolidated central processing location coupled to said distributed locations and including an application server holding and executing the business object to perform back office trade finance business logic for processing international trade finance transactions across multiple bank organizations in real-time responsive to initiation by the work stations with constant processing availability using a consolidated database in processing; the database having base currencies corresponding to country sources of the transactions.

8. A system as recited in claim 7, wherein said business object communicates with a consolidated database server for data required by the business logic.

9. A system as recited in claim 7, wherein one of the work stations executes a business object.

10. A system as recited in claim 7, wherein a communication object communicates between the interface and the business object.

11. A system as recited in claim 7, wherein workers at different geographic locations have different work periods and said central processing location reassigning work items to the different locations responsive to the periods.

12. A system as recited in claim 7, wherein the business logic is performed relative to a trade instrument identified on said interface, the trade instrument having a trade document associated therewith and said system further comprising an image server storing an image of the document and a link to the instrument, allowing the interface to retrieve the image from the instrument.

13. A system as recited in claim 7, further comprising connection and transport objects providing communication between said interface and said business object.

14. A system as recited in claim 7, wherein said interface includes only input output logic.

15. A system as recited in claims 7, further comprising an object communication service requesting attribute values for fields of a window of said interface.

16. A system as recited in claim 7, further comprising an attribute manager accessing an attribute object for an attribute of the business object.

17. A trade finance system handling trade commerce transaction financing, comprising:

geographically distributed processing locations, each location located in a different time zone and including user work stations having a trade finance interface initiating execution of a business object, and providing access to trade finance work items comprising issuances, advisements, amendments and payments and a document image related to the work item and an instrument to the transaction financier staff;

a consolidated central processing location coupled to said distributed locations and consolidating back office processing of the work items using a consolidated database in processing the work items and across the different time zones providing twenty-four hour seven day a week processing by assigning the work items to workers at different geographic locations having different work periods and providing the image of the document with constant processing and image availability items comprising issuances, advisements, amendments, and payments, using a work flow distribution rules table and a rollover rules table with a rule making process and comprising:

an application server holding and executing the business object to perform trade finance business logic responsive to initiation by the work stations, a communication object communicating between the interface and the business object, and an attribute manager accessing an attribute object for an attribute of the business object;

a database server storing a consolidated database comprising data required by the business logic and having multiple base currencies; and an image server storing an image of the document and a link to the instrument, allowing the interface to retrieve the image from the instrument, the document or the work item.

* * * * *

UNITED STATES PATENT AND TRADEMARK OFFICE
CERTIFICATE OF CORRECTION

| | |
|---|---|
| PATENT NO. | : 6,772,131 B1 |
| DATED | : August 3, 2004 |
| INVENTOR(S) | : James G. Francis et al. |

It is certified that error appears in the above-identified patent and that said Letters Patent is hereby corrected as shown below:

<u>Title page,</u>
Item [56], References Cited, FOREIGN PATENT DOCUMENTS, insert
-- WO 99/50776      7/1999  PCT --

<u>Column 4,</u>
Line 29, change "Ti" to -- T1 --.

<u>Column 10,</u>
Line 4, change "282 ,  and" to -- 282, and --.

<u>Column 13,</u>
Line 1, change "form" to -- from --.

<u>Column 16,</u>
Line 50, change "claims" to -- claim --.

Signed and Sealed this

Twenty-third Day of November, 2004

JON W. DUDAS
*Director of the United States Patent and Trademark Office*